(12) United States Patent
Christodorescu et al.

(10) Patent No.: US 9,742,559 B2
(45) Date of Patent: Aug. 22, 2017

(54) INTER-MODULE AUTHENTICATION FOR SECURING APPLICATION EXECUTION INTEGRITY WITHIN A COMPUTING DEVICE

(71) Applicant: QUALCOMM Incorporated, San Diego, CA (US)

(72) Inventors: Mihai Christodorescu, San Jose, CA (US); Rajarshi Gupta, Sunnyvale, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/099,108

(22) Filed: Dec. 6, 2013

(65) Prior Publication Data

US 2014/0205099 A1 Jul. 24, 2014

Related U.S. Application Data

(60) Provisional application No. 61/755,171, filed on Jan. 22, 2013.

(51) Int. Cl.
*H04L 9/08* (2006.01)
*G06F 21/44* (2013.01)
(Continued)

(52) U.S. Cl.
CPC .......... *H04L 9/0819* (2013.01); *G06F 21/445* (2013.01); *G06F 21/566* (2013.01);
(Continued)

(58) Field of Classification Search
CPC ....................................................... G06F 9/54
See application file for complete search history.

(56) References Cited

U.S. PATENT DOCUMENTS 5,870,735 A 2/1999 Agrawal et al.
6,532,541 B1 3/2003 Chang et al.
(Continued)

FOREIGN PATENT DOCUMENTS

CN 101689167 A 3/2010
CN 101770453 A 7/2010
(Continued)

OTHER PUBLICATIONS

Caruana, et al., "An Empirical Comparison of Supervised Learning Algorithms", ICML, 2006, 8 pgs.
(Continued)

*Primary Examiner* — Saleh Najjar
*Assistant Examiner* — Louis Teng
(74) *Attorney, Agent, or Firm* — The Marbury Law Group, PLLC

(57) ABSTRACT

Systems and methods for recognizing and reacting to malicious or performance-degrading behaviors in a mobile device include observing mobile device behaviors in an observer module within a privileged-normal portion of a secure operating environment to identify a suspicious mobile device behavior. The observer module may generate a concise behavior vector based on the observations, and provide the vector to an analyzer module in an unprivileged-secure portion of the secure operating environment. The vector may be analyzed in the unprivileged-secure portion to determine whether the mobile device behavior is benign, suspicious, malicious, or performance-degrading. If the behavior is found to be suspicious, operations of the observer module may be adjusted, such as to perform deeper observations. If the behavior is found to be malicious or performance-degrading behavior the user and/or a client module may be alerted in a secure, tamper-proof manner.

11 Claims, 18 Drawing Sheets

(51) Int. Cl.

| | | |
|---|---|---|
| *G06F 21/56* | (2013.01) | |
| *G06F 21/57* | (2013.01) | |
| *G06F 21/60* | (2013.01) | |
| *H04L 9/32* | (2006.01) | |
| *H04L 29/06* | (2006.01) | |
| *H04W 12/02* | (2009.01) | |
| *H04W 12/04* | (2009.01) | |

(52) U.S. Cl.
CPC ............ *G06F 21/57* (2013.01); *G06F 21/606* (2013.01); *H04L 9/083* (2013.01); *H04L 9/0861* (2013.01); *H04L 9/321* (2013.01); *H04L 9/3236* (2013.01); *H04L 9/3297* (2013.01); *H04L 63/0428* (2013.01); *H04L 63/061* (2013.01); *H04W 12/02* (2013.01); *H04W 12/04* (2013.01); *G06F 2221/2149* (2013.01)

(56) References Cited

U.S. PATENT DOCUMENTS

| | | | |
|---|---|---|---|
| 6,643,802 B1 | 11/2003 | Frost et al. | |
| 6,647,260 B2 | 11/2003 | Dusse et al. | |
| 7,051,327 B1 | 5/2006 | Milius et al. | |
| 7,401,359 B2 | 7/2008 | Gartside et al. | |
| 7,559,053 B2 | 7/2009 | Krassovsky et al. | |
| 7,561,877 B2 | 7/2009 | Cassett et al. | |
| 7,571,478 B2 | 8/2009 | Munson et al. | |
| 7,600,014 B2 | 10/2009 | Russell et al. | |
| 7,650,317 B2 | 1/2010 | Basu et al. | |
| 7,676,573 B2 | 3/2010 | Herzog et al. | |
| 7,694,150 B1 | 4/2010 | Kirby | |
| 7,757,292 B1 | 7/2010 | Renert et al. | |
| 7,774,599 B2 | 8/2010 | Guo et al. | |
| 7,831,237 B2 | 11/2010 | Passarella et al. | |
| 7,831,248 B2 | 11/2010 | Lee | |
| 7,849,360 B2 | 12/2010 | Largman et al. | |
| 7,852,938 B2 | 12/2010 | Shi et al. | |
| 7,877,621 B2 | 1/2011 | Jacoby et al. | |
| 7,881,291 B2 | 2/2011 | Grah | |
| 7,890,443 B2 | 2/2011 | Zhang et al. | |
| 7,945,955 B2 | 5/2011 | Katkar | |
| 8,045,958 B2 | 10/2011 | Kahandaliyanage | |
| 8,087,067 B2 | 12/2011 | Mahaffey et al. | |
| 8,095,964 B1 | 1/2012 | Zhong et al. | |
| 8,161,548 B1 | 4/2012 | Wan | |
| 8,201,244 B2 | 6/2012 | Sun et al. | |
| 8,201,249 B2 | 6/2012 | McCallam | |
| 8,225,093 B2 | 7/2012 | Fok | |
| 8,245,295 B2 | 8/2012 | Park et al. | |
| 8,245,315 B2 | 8/2012 | Cassett et al. | |
| 8,266,698 B1 | 9/2012 | Seshardi et al. | |
| 8,311,956 B2 | 11/2012 | Sen et al. | |
| 8,312,545 B2 | 11/2012 | Tuvell et al. | |
| 8,321,941 B2 | 11/2012 | Tuvell et al. | |
| 8,331,987 B2 | 12/2012 | Rosenblatt | |
| 8,332,945 B2 | 12/2012 | Kim et al. | |
| 8,347,386 B2 | 1/2013 | Mahaffey et al. | |
| 8,397,301 B2 | 3/2013 | Hering et al. | |
| 8,443,439 B2 | 5/2013 | Lamastra et al. | |
| 8,458,809 B2* | 6/2013 | Adams et al. | 726/30 |
| 8,516,584 B2 | 8/2013 | Moskovitch et al. | |
| 8,533,844 B2 | 9/2013 | Mahaffey et al. | |
| 8,554,912 B1 | 10/2013 | Reeves et al. | |
| 8,694,744 B1 | 4/2014 | Raj et al. | |
| 8,701,192 B1 | 4/2014 | Glick et al. | |
| 8,762,298 B1 | 6/2014 | Ranjan et al. | |
| 8,763,127 B2 | 6/2014 | Yao et al. | |
| 8,775,333 B1 | 7/2014 | Zahn | |
| 8,782,412 B2 | 7/2014 | Charles et al. | |
| 8,943,204 B2 | 1/2015 | Caldeira De Andrada et al. | |
| 9,432,361 B2 | 8/2016 | Mahaffey et al. | |
| 2002/0099756 A1 | 7/2002 | Catthoor et al. | |
| 2004/0039924 A1* | 2/2004 | Baldwin et al. | 713/189 |
| 2004/0068721 A1 | 4/2004 | O'Neill et al. | |
| 2004/0083366 A1* | 4/2004 | Nachenberg et al. | 713/170 |
| 2004/0221163 A1 | 11/2004 | Jorgensen et al. | |
| 2005/0144480 A1 | 6/2005 | Kim et al. | |
| 2006/0026464 A1 | 2/2006 | Atkin et al. | |
| 2006/0085854 A1 | 4/2006 | Agrawal et al. | |
| 2006/0288209 A1* | 12/2006 | Vogler | 713/168 |
| 2007/0006304 A1 | 1/2007 | Kramer et al. | |
| 2007/0136455 A1 | 6/2007 | Lee et al. | |
| 2007/0174490 A1 | 7/2007 | Choi et al. | |
| 2007/0192866 A1 | 8/2007 | Sagoo et al. | |
| 2007/0199060 A1 | 8/2007 | Touboul | |
| 2007/0220327 A1 | 9/2007 | Ruscio et al. | |
| 2007/0283170 A1* | 12/2007 | Yami et al. | 713/193 |
| 2007/0287387 A1 | 12/2007 | Keum et al. | |
| 2007/0294768 A1 | 12/2007 | Moskovitch et al. | |
| 2008/0016339 A1 | 1/2008 | Shukla | |
| 2008/0026464 A1 | 1/2008 | Borenstein et al. | |
| 2008/0046755 A1* | 2/2008 | Hayes | 713/187 |
| 2008/0047009 A1 | 2/2008 | Overcash et al. | |
| 2008/0086773 A1 | 4/2008 | Tuvell et al. | |
| 2008/0109495 A1 | 5/2008 | Herberger et al. | |
| 2008/0126800 A1* | 5/2008 | Guo | G06F 21/57 713/167 |
| 2008/0140821 A1 | 6/2008 | Tada | |
| 2008/0162686 A1 | 7/2008 | Kalaboukis et al. | |
| 2008/0163382 A1 | 7/2008 | Blue et al. | |
| 2008/0172746 A1 | 7/2008 | Lotter et al. | |
| 2008/0228429 A1 | 9/2008 | Huang et al. | |
| 2009/0019546 A1 | 1/2009 | Park et al. | |
| 2009/0019551 A1* | 1/2009 | Haga | G06F 21/57 726/27 |
| 2009/0192955 A1 | 7/2009 | Tang et al. | |
| 2009/0199296 A1 | 8/2009 | Xie et al. | |
| 2009/0217078 A1 | 8/2009 | Cassett et al. | |
| 2009/0239531 A1 | 9/2009 | Andreasen et al. | |
| 2009/0287618 A1 | 11/2009 | Weinberger et al. | |
| 2009/0288080 A1 | 11/2009 | Partridge | |
| 2009/0288164 A1 | 11/2009 | Adelstein et al. | |
| 2009/0293121 A1 | 11/2009 | Bigus et al. | |
| 2009/0300765 A1 | 12/2009 | Moskovitch et al. | |
| 2009/0327168 A1 | 12/2009 | Weinberger et al. | |
| 2010/0005045 A1 | 1/2010 | Hiraoka et al. | |
| 2010/0010949 A1 | 1/2010 | Ito et al. | |
| 2010/0011029 A1 | 1/2010 | Niemelae | |
| 2010/0036786 A1 | 2/2010 | Pujara | |
| 2010/0082513 A1 | 4/2010 | Liu | |
| 2010/0105404 A1 | 4/2010 | Palanki et al. | |
| 2010/0107257 A1 | 4/2010 | Ollmann | |
| 2010/0128125 A1 | 5/2010 | Warzelhan | |
| 2010/0153371 A1 | 6/2010 | Singh | |
| 2010/0154032 A1 | 6/2010 | Ollmann | |
| 2010/0175135 A1 | 7/2010 | Kandek et al. | |
| 2010/0192201 A1 | 7/2010 | Shimoni et al. | |
| 2010/0192222 A1 | 7/2010 | Stokes et al. | |
| 2010/0241974 A1 | 9/2010 | Rubin et al. | |
| 2010/0251340 A1 | 9/2010 | Martin et al. | |
| 2010/0262693 A1 | 10/2010 | Stokes et al. | |
| 2010/0296496 A1 | 11/2010 | Sinha et al. | |
| 2010/0299292 A1 | 11/2010 | Collazo | |
| 2010/0313269 A1 | 12/2010 | Ye | |
| 2011/0004935 A1 | 1/2011 | Moffie et al. | |
| 2011/0013528 A1 | 1/2011 | Chen | |
| 2011/0023118 A1 | 1/2011 | Wright | |
| 2011/0060948 A1 | 3/2011 | Beebe | |
| 2011/0105096 A1 | 5/2011 | Dods et al. | |
| 2011/0145920 A1 | 6/2011 | Mahaffey et al. | |
| 2011/0161452 A1 | 6/2011 | Poornachandran et al. | |
| 2011/0219449 A1 | 9/2011 | St. Neitzel et al. | |
| 2011/0264764 A1 | 10/2011 | Kewalramani et al. | |
| 2011/0286437 A1 | 11/2011 | Austin et al. | |
| 2011/0302654 A1 | 12/2011 | Miettinen | |
| 2011/0302656 A1 | 12/2011 | El-Moussa | |
| 2011/0307233 A1 | 12/2011 | Tseng et al. | |
| 2012/0016633 A1 | 1/2012 | Wittenstein et al. | |
| 2012/0051228 A1 | 3/2012 | Shuman et al. | |
| 2012/0060219 A1 | 3/2012 | Larsson et al. | |
| 2012/0096539 A1 | 4/2012 | Hu et al. | |
| 2012/0110174 A1 | 5/2012 | Wootton et al. | |

(56) References Cited

U.S. PATENT DOCUMENTS

| | | |
|---|---|---|
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1* | 6/2012 | Raleigh et al. ............... 726/1 |
| 2012/0167217 A1 | 6/2012 | McReynolds |
| 2012/0167218 A1 | 6/2012 | Poornachandran et al. |
| 2012/0167219 A1 | 6/2012 | Zaitsev et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2012/0331137 A1 | 12/2012 | Olsen et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1* | 6/2013 | Baumann et al. ............ 713/164 |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0237595 A1 | 8/2014 | Sridhara et al. |
| 2014/0245306 A1 | 8/2014 | Gathala |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0339675 A1 | 11/2015 | Tuchman et al. |
| 2015/0356462 A1 | 12/2015 | Fawaz et al. |
| 2016/0088009 A1 | 3/2016 | Gupta et al. |

FOREIGN PATENT DOCUMENTS

| | | |
|---|---|---|
| CN | 101882000 A | 11/2010 |
| CN | 102110211 A | 6/2011 |
| CN | 102202102 A | 9/2011 |
| CN | 102222192 A | 10/2011 |
| CN | 10259169 A | 7/2012 |
| CN | 102651061 A | 8/2012 |
| CN | 102790758 A | 11/2012 |
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2515250 A1 | 10/2012 |
| EP | 2680182 A1 | 1/2014 |
| JP | 2008234520 A | 10/2008 |
| JP | 2010113488 A | 5/2010 |
| JP | 2010520566 A | 6/2010 |
| JP | 2011138219 A | 7/2011 |
| JP | 2012212380 A | 11/2012 |
| KR | 20060033067 A | 4/2006 |
| TW | 200937198 A | 9/2009 |
| TW | 201129817 A | 9/2011 |
| TW | 201239618 A | 10/2012 |
| WO | 2006012375 | 2/2006 |
| WO | 2009017231 A2 | 2/2009 |
| WO | 2010048502 | 4/2010 |
| WO | WO-2010126416 A1 | 11/2010 |
| WO | WO-2011147580 A1 | 12/2011 |
| WO | WO-2013016692 | 1/2013 |
| WO | 2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Caruana, et al., "An Empirical Evaluation of Supervised Learning in High Dimensions", ICML, 2008, 8 pgs.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

Lu Y. B., et al., "Using Multi-Feature and Classifier Ensembles to Improve Malware Detection", Journal of Chung Cheng Instutite of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rates in Network Intrusion Detection", Internatinal Journal of Computer Science and Information Technology & Security, vol. 2, No. 2, Apr. 2012, pp. 349-358, XP55086347, ISSN: 2249-955.

Qin F., "System Support for Improving Software Dependability During Production Runs," Urbana, Illinois, 1998, pp. 1-116.

Shabta A., "Malware Detection on Mobile Devices", Proceedings of the 11th International Conference on Mobile Data Management, (MDM'2010), May 23, 2010, pp. 289-290, XP031692994, DOI: 10.1109/MDM.2010.28.

Shabtai A., et al., "Detecting unknown malicious code by applying classification techniques on OpCode patterns," Security Informatics a Springer Open Journal, 2012, vol. 1 (1), pp. 1-22.

Sheen S., et al., "Network Intrusion Detecting using Feature Selection and Decision tree classifier," TENCON—IEEE Region 10 Conference, 2008, pp. 1-4.

Wang Y-M., et al., "Strider: A Black-Box, State-based Approach to Change and Configuration Management and Support," 2003 LISA XVII—Oct. 26-31, 2003—San Diego, CA, pp. 165-178.

Shabtai A., et al., "A Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]-paragraph [5.3.4].

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent

(56) References Cited

OTHER PUBLICATIONS

Agent Technologies (WI-IAT'09), vol. 1, Sep. 15, 2009, pp. 675-678, XP055107983, DOI: 10.1109/WI-IAT.2009.113 the whole document.
Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/WI-IATW. 2007.52 the whole document.
Kachirski O., et al., "Effective Intrusion Detection Using Windows Sensors in Wireless Ad Hoc Networks", IEEE Proceedings of the 36th Hawaii International Conference on System Sciences, 2002, 8 Pages.
Kirda E., et al., "Behavior-Based Spyware Detection", 15th USENIX Security Symposium, 2002, pp. 273-288.
Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.
Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.
Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.
Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.
De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412. 2364435, Section 5.
Kolter J.Z., et al., "Learning to Detect Malicious Executables in the Wild", ACM Knowl. Discovery and Data Mining (KDD), 2004, pp. 470-478.
Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.
Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/JarleKittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrieved on Jun. 13, 2013] the whole document.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.
Tan, P.N., et al., "Introduction to data mining," Library of Congress, 2006, Chapter 4.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.
Kaspersky Endpoint Security 8 for Smartphone Program Version 8.0, Updated on Feb. 8, 2012.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Faddoul J.B., et al., "Boosting Multi-Task Weak Learners with Applications to Textual and Social Data," Ninth International Conference on Machine Learning and Applications (ICMLA), Dec. 2010, pp. 367-372.
Niculescu-Mizil A., et al., "Predicting Good Probabilities with Supervised Learning", Proceedings/Twenty-Second International Conference on Machine Learning, Bonn, Germany, Aug. 7-11, 2005, Association for Computing Machinery, New York, Aug. 7, 2005 (Aug. 7, 2005), pp. 625-632, XP058203964, DOI: 10.1145/1102351.11 024301SBN: 978-1-59593-180-1.
Hu W., et al., "Online Adaboost-Based Parameterized Methods for Dynamic Distributed Network Intrusion Detection", IEEE Transactions on Cybernetics, vol. 44, No. 1, Mar. 27, 2013 (Mar. 27, 2013), pp. 66-82, XP011533908, DOI: 10.1109/TCYB.2013. 2247592.
Jean E., et al., "Addressing Mobile Agent Security Through Agent Collaboration", Journal of Information Processing Systems, vol. 3, No. 2, Dec. 2007 (Dec. 2007), pp. 43-53, XP055341844, DOI: 10.3745/JIPS.2008.3.2.043.

\* cited by examiner

INTER-MODULE AUTHENTICATION FOR SECURING APPLICATION EXECUTION INTEGRITY WITHIN A COMPUTING DEVICE

RELATED APPLICATIONS

This application claims the benefit of priority to U.S. Provisional Patent Application No. 61/755,171 entitled "Secure Behavior Analysis over Trusted Execution Environment" filed Jan. 22, 2013, the entire contents of which are hereby incorporated by reference for all purposes.

This application is also related to U.S. patent application Ser. No. 13/929,082 entitled "Secure Behavior Analysis over Trusted Execution Environment" filed Jun. 27, 2013 which also claims the benefit of priority to U.S. Provisional Patent Application No. 61/755,171.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications.

To keep pace with these service enhancements, mobile electronic devices (e.g., cellular phones, tablets, laptops, etc.) have become more feature rich and complex than ever, and now commonly include multiple processors, system-on-chips (SoCs), multiple memories, and other resources (e.g., power rails, etc.) that allow mobile device users to execute complex and power intensive software applications (e.g., video streaming, video processing, etc.) on their mobile devices. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers. In addition, as mobile computing devices and related technologies continue to grow in popularity and use, and as malware and cyber attacks grow in frequency and sophistication, improving the security, performance, and power consumption characteristics of the device and its software systems and modules are increasingly important for mobile device designers.

SUMMARY

The various aspects include methods of performing secure inter-module communication in a computing device having a high level operating system, which may include a first process executing in the computing device providing a communication request message to a secure authentication process executing in a trusted portion of the computing device, the secure authentication process performing an integrity check of the first process by accessing a portion of a memory of the computing device allocated to the first process by the high level operating system to generate a cryptographic measurement, the secure authentication process generating a key that includes the cryptographic measurement in response to authenticating the first processing, providing the key from the secure authentication process to the first process, providing a second communication request message and the key from the first process to a second process executing in the computing device, authenticating the first process by the second process based on the cryptographic measurement included in the key, and communicating by the second process with the first process only when the cryptographic measurement included in the key indicates that the first process can be trusted. In an aspect, generating the key may include generating the key to include information about a communication channel allocated to the first process by the high level operating system. In an aspect, performing the integrity check of the first process may include generating a cryptographic hash of the first process's code, data, or both. In an aspect, the second process authenticating the first process based on the cryptographic measurement included in the key may include the second process comparing the cryptographic hash of the first process to a hash obtained from a public repository or from a repository internal to the second process. In an aspect, the method may include monitoring, by the first process, device behaviors over a period of time to recognize device behaviors that are inconsistent with normal operation patterns, in which communicating by the second process with the first process includes receiving behavior information by the second processing from the first process.

In an aspect, the method may include monitoring, by the first process, device behaviors over a period of time in a privileged-normal portion of a secure operating environment to identify a suspicious mobile device behavior, and generating a concise behavior vector by the first process in the privileged-normal portion based on behavior information collected when monitoring device behaviors, in which communicating by the second process with the first process includes the second process receiving the concise behavior vector from the first process. In an aspect, the method may include analyzing the concise behavior vector in a unprivileged-normal portion of the secure operating environment to determine whether a behavior is benign, suspicious, malicious, or performance-degrading.

Further aspects include a computing device having a multi-core processor that includes two or more processor cores, one or more of which may be configured with processor-executable instructions to perform operations including executing a first process, the first process providing a communication request message to a secure authentication process executing in a trusted portion of the computing device, the secure authentication process performing an integrity check of the first process by accessing a portion of a memory of the computing device allocated to the first process by a high level operating system of the computing device to generate a cryptographic measurement, generating a key by the secure authentication process in response to authenticating the first processing, the key including the cryptographic measurement, providing the key from the secure authentication process to the first process, providing a second communication request message and the key from the first process to a second process executing in the multi-core processor, authenticating the first process by the second process based on the cryptographic measurement included in the key, and communicating by the second process with the first process only when the cryptographic measurement included in the key indicates that the first process can be trusted.

In an aspect, one or more of the processor cores may be configured with processor-executable instructions to perform operations such that generating the key includes generating the key to include information about a communication channel allocated to the first process by the high level operating system. In an aspect, one or more of the processor cores may be configured with processor-executable instructions to perform operations such that performing the integrity check of the first process includes generating a cryptographic hash of the first process's code, data, or both. In an aspect, one or more of the processor cores may be configured with processor-executable instructions to perform operations such that the second process authenticating the first process based on the cryptographic measurement included in the key includes the second process comparing the cryptographic hash of the first process to a hash obtained from a public repository or from a repository internal to the second process.

In an aspect, one or more of the processor cores may be configured with processor-executable instructions to perform operations further including monitoring, by the first process, device behaviors over a period of time to recognize device behaviors that are inconsistent with normal operation patterns, in which communicating by the second process with the first process includes receiving behavior information by the second processing from the first process.

In an aspect, one or more of the processor cores may be configured with processor-executable instructions to perform operations further including monitoring, by the first process, device behaviors over a period of time in a privileged-normal portion of a secure operating environment to identify a suspicious mobile device behavior, and generating a concise behavior vector by the first process in the privileged-normal portion based on behavior information collected when monitoring device behaviors, in which communicating by the second process with the first process includes the second process receiving the concise behavior vector from the first process.

In an aspect, one or more of the processor cores may be configured with processor-executable instructions to perform operations further including analyzing the concise behavior vector in a unprivileged-normal portion of the secure operating environment to determine whether a behavior is benign, suspicious, malicious, or performance-degrading.

Further aspects include a non-transitory computer readable storage medium having stored thereon processor-executable software instructions configured to cause a processor to perform operations for performing secure inter-module communication in a computing device having a high level operating system, the operations including executing a first process, the first process providing a communication request message to a secure authentication process executing in a trusted portion of the computing device, the secure authentication process performing an integrity check of the first process by accessing a portion of a memory of the computing device allocated to the first process by the high level operating system to generate a cryptographic measurement, generating a key by the secure authentication process in response to authenticating the first processing, the key including the cryptographic measurement, providing the key from the secure authentication process to the first process, providing a second communication request message and the key from the first process to a second process executing in the computing device, authenticating the first process by the second process based on the cryptographic measurement included in the key, and communicating by the second process with the first process only when the cryptographic measurement included in the key indicates that the first process can be trusted.

In an aspect, the stored processor-executable software instructions may be configured to cause a processor to perform operations such that generating the key includes generating the key to include information about a communication channel allocated to the first process by the high level operating system. In an aspect, the stored processor-executable software instructions may be configured to cause a processor to perform operations such that performing the integrity check of the first process includes generating a cryptographic hash of the first process's code, data, or both.

In an aspect, the stored processor-executable software instructions may be configured to cause a processor to perform operations such that the second process authenticating the first process based on the cryptographic measurement included in the key includes the second process comparing the cryptographic hash of the first process to a hash obtained from a public repository or from a repository internal to the second process.

In an aspect, the stored processor-executable software instructions may be configured to cause a processor to perform operations further including monitoring, by the first process, device behaviors over a period of time to recognize device behaviors that are inconsistent with normal operation patterns, in which communicating by the second process with the first process includes receiving behavior information by the second processing from the first process.

In an aspect, the stored processor-executable software instructions may be configured to cause a processor to perform operations further including monitoring, by the first process, device behaviors over a period of time in a privileged-normal portion of a secure operating environment to identify a suspicious mobile device behavior, and generating a concise behavior vector by the first process in the privileged-normal portion based on behavior information collected when monitoring device behaviors, in which communicating by the second process with the first process includes the second process receiving the concise behavior vector from the first process. In a further aspect, the stored processor-executable software instructions may be configured to cause a processor to perform operations further including analyzing the concise behavior vector in a unprivileged-normal portion of the secure operating environment to determine whether a behavior is benign, suspicious, malicious, or performance-degrading.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
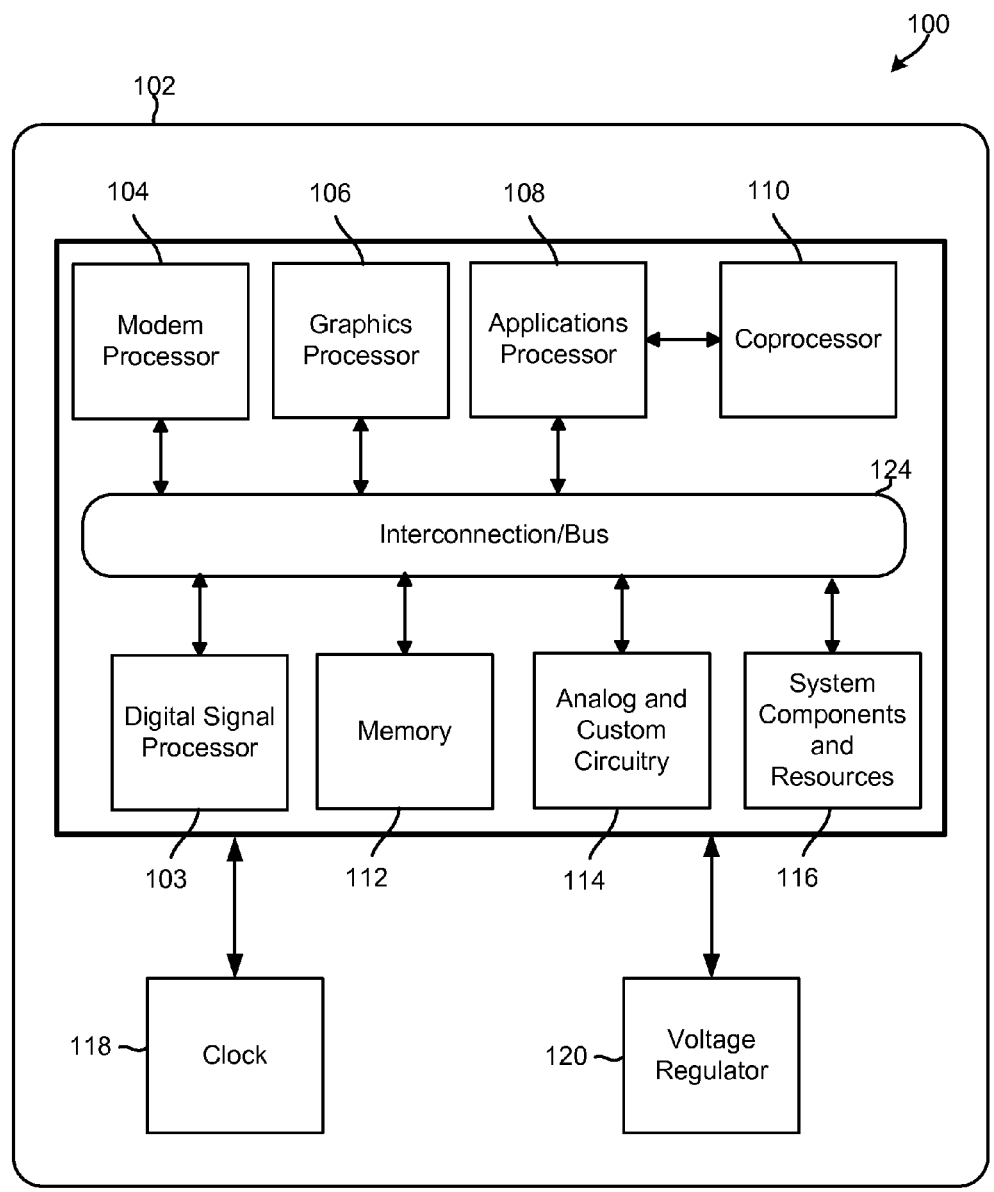
FIG. 1 is a block diagram illustrating components of an example system on chip that may be included in mobile device and configured to secure communications between modules in accordance with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

In overview, the various aspects include methods, and computing devices configured to implement the methods, of securing communications between two or more processes, daemons, modules, sub-systems, or components (collectively "modules") in a computing system via a trusted central authority that is included in a secure or trusted execution environment (e.g., ARM TrustZone®, etc.) of the computing device. The trusted central authority may monitor the different modules and certify encryption keys so that the modules may authenticate one another to ensure that they are not maliciously modified before they communicate with each other. The trusted central authority allows inter-module communications to be encrypted and authenticated using keys that are tied to the integrity of the communicating modules themselves, which allows each module to determine whether a communication/request from another module is secure, authentic, and/or should be trusted.

The various aspects also include a comprehensive behavior observation and analysis system that is suitable for identifying and preventing various conditions and behaviors that may degrade a mobile device's performance, power utilization levels, network usage levels, security and/or privacy over time. The comprehensive behavior observation and analysis system may be implemented as a plurality of modules, two or more of which may be included, implemented, actuated, stored, and/or executed in different privilege/protection domains or in different portions of the secure/trusted environment.

By securing, validating, and/or authenticating the modules without requiring that the modules be included in the same privileged or secured protection domain, the various aspects allow the mobile device to securely monitor and analyze mobile device behaviors for extended periods of time (or near continuously) without consuming an excessive amount of processing, memory, or energy resources of the mobile device. In addition, the various aspects prevent malicious applications from circumventing or avoiding detection by the behavior observation and analysis system by spoofing, modifying, preventing, or otherwise tampering with inter-module communications.

While the various aspects are generally useful in any computing system that includes a secured or trusted execution environment and modules that exchange information with other modules, the aspects are especially useful in resource constrained computing environments (e.g., mobile devices) that store, include, or execute software systems or solutions that have access to broad swaths of the computing device, such as in a comprehensive behavior observation and analysis system.

To focus the discussion on the relevant features, various aspects are discussed using a mobile device configured with a comprehensive behavior observation and analysis system as an exemplary device/system. However, nothing in the specification should be construed to limit the claims to mobile devices or behavior observation and analysis systems unless such features are expressly recited in the claims.

The terms "computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices that include a memory, a programmable processor for which performance is important. While the various aspects are particularly useful for mobile computing devices, such as smartphones, which have limited resources and run on battery, the aspects are generally useful in any electronic device that includes a processor and executes application programs.

The terms "performance degrading" and "performance degradation" are used herein to refer to a wide variety of undesirable mobile device operations and characteristics, such as longer processing times, slower real time responsiveness, lower battery life, loss of private data, malicious economic activity (e.g., sending unauthorized premium SMS messages), denial of service (DoS), operations relating to commandeering the mobile device or utilizing the phone for spying or botnet activities, etc.

Generally, the performance and power efficiency of a mobile device degrades over time. In recent years, anti-virus companies (e.g., McAfee, Symantec, etc.) have begun marketing mobile anti-virus, firewall, and encryption products that aim to slow this degradation. However, many of these solutions rely on the periodic execution on the mobile device, of a computationally-intensive scanning engine that may consume many of the mobile device's processing and battery resources, slow or render the mobile device useless for extended periods of time, or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of the mobile device over time, including poorly designed software applications, malware, viruses, fragmented memory, background processes, etc. Due to the number, variety, and complexity of these factors, it is often not feasible to evaluate all the various processes, components, behaviors, or factors (or combinations thereof) that may degrade performance and/or power utilization levels of the complex yet resource-constrained systems of modern mobile devices. As such, it is difficult for users, operating systems, and/or application programs (e.g., anti-virus software, etc.) to accurately and efficiently identify the sources of such problems.

To overcome the above-limitations of existing systems and solutions, various aspects may include a mobile device configured with a comprehensive behavioral monitoring and analysis system configured to intelligently and dynamically identify performance-degrading mobile device behaviors without consuming a significant amount of the mobile device's processing and battery resources. To achieve this, the behavioral monitoring and analysis system may instrument, include, implement, actuate, store, or execute a plurality of specialized modules at various levels of the mobile device. For example, the system may include an observer module and an analyzer module, and the observer module may be configured to continuously (or near continuously) monitor mobile device behaviors and collect behavior information from various application programming interfaces (APIs), registers, counters or other components in the mobile device. The observer module may provide the collected behavior information to the analyzer module, which may receive and use this information to determine whether a mobile device behavior, software application, or process is benign or not benign (i.e., suspicious, malicious or performance-degrading).

While the behavioral monitoring and analysis system discussed above is generally very effective for preventing the degradation in performance and power utilization levels of a mobile device over time, a malicious software application might attempt to circumvent or evade detection by this systems by altering, modifying or otherwise attacking the communications between modules or the modules themselves. The behavioral monitoring and analysis system includes a plurality of modules that communicate large amounts of information with each other via memory read/write operations, data packets, procedure calls, function calls, message exchanges, domain sockets (e.g., Unix-domain sockets), remote procedure calls, remote method invocations, or other forms of inter-process communications (IPCs). If these information exchange operations are susceptible to cyber attacks or malicious software applications, the effectiveness of the behavioral monitoring and analysis system could be compromised.

In order to protect the computing system from the unauthorized modification of the data exchanges between modules, spoofed data, denial of service attacks, and other similar cyber attacks and malware executing within a computing device, existing solutions require that the modules be implemented, actuated, stored, and/or executed in a secure portion of the trusted environment (e.g., ARM TrustZone®, etc.). Mobile device manufacturers have developed various trusted execution environments, such as the ARM TrustZone® and other solutions, that are configured to provide an open, secure, and feature-rich operating environment that allows users to download and execute third party software applications. These solutions establish a trusted execution zone in which a pre-authenticated software application or module is provided access to privileged or restricted features/operations of an operating system, such as the ability to modify system files, start or stop daemons, create or remove users/groups, or override the protections of the operating system. These solutions rely heavily on the pre-authentication of the software applications or modules, which typically requires including all of the modules that are to be secured in the same secure or trusted environment.

To avoid a malicious software application from circumventing such protections, existing solutions typically require that the modules be included in the secured/trusted execution environment so that all of the information that is communicated between modules is verified, encrypted and/or otherwise secured within that environment. Yet, the operations of verifying, encrypting and securing the communications may consume a significant amount of processing and energy resources. As such, existing trust/security solutions are not feasible for use in resource-constrained systems that read, write, or other communicate large amounts of information between modules or across protection domains, such as in mobile devices that include a comprehensive behavior observation and analysis system.

By securing the communications between two modules without requiring that either module be included in a secure/trusted environment (e.g., ARM TrustZone®, etc.), the various aspects protect a computing device from the unauthorized modification of the communications between two or more of its modules, spoofed data, denial of service attacks, and from other forms of cyber attacks and malware. When implemented in a mobile device that includes a comprehensive behavioral monitoring and analysis system, the various aspects help to prevent malware from circumventing or avoiding detection by the behavioral monitoring and analysis system. The various aspects accomplish this efficiently and without consuming a significant amount of the mobile device's processing and battery resources.

In an aspect, a computing device may be configured to secure the data exchanges and other communications between a first module of the computing device (e.g., the observer module) and a second module of the same computing device (e.g., the analyzer module). This may be accomplished by the first module requesting and receiving a key or ticket from a key distribution module within the computing device, and providing the key/ticket to the second module as part of the initial data exchange or other communications between the two modules (e.g., request to establish a secure channel, request to perform inter-module communication, etc.). The second module may receive and use the information included in the key/ticket to determine whether the first module should be trusted by verifying that the key/ticket originated from a trusted key distribution module and that the first module has been authenticated by the key distribution module. The second module may also use integrity measurement information included in the key/ticket to make an independent determination regarding the integrity of the first module and/or the requested communication channel/link.

If the second module of the computing device determines that the first module is secure/should be trusted, the second module may request another key/ticket from a key distribution module within the computing device and provide the key/ticket to the first module along with a response to the initial communication request. The first module may receive and use the information included in the key/ticket to determine whether the second module should be trusted. For example, the first module within the computing device may verify that the key/ticket originated from a trusted key distribution module within the computing device, that the second module has been authenticated by the key distribution module within the computing device, and that the integrity of the second module within the computing device has not been compromised (e.g., via integrity measurement information included in the key/ticket). When the first module determines that the second module should be trusted, it may establish a secure data exchange or other communication link between the first and second modules.

The key distribution module may be implemented or included in a privileged portion of the operating system and in a secured/trusted environment (e.g., ARM TrustZone®, etc.) of the mobile device. The key distribution module may be configured to receive the key/ticket request message from a module, and to use the information included in the request message to authenticate that module. The key distribution module may be configured to generate the key/ticket only for valid/authenticated components so that only a valid requester receives a key/ticket that includes a session key.

The key distribution module may also perform an integrity check of a module by computing or taking an integrity measurement. This may be accomplished by the key distribution module performing a cryptographic checksum (or hash-sum) of the contents of the portions of the computing device's memory that store or are used by that module. For example, the key distribution module may perform a checksum algorithm on object code of the module to generate a datum (e.g., a fixed reference value) or checksum value that may be used to verify the integrity of the module, such as by comparing the generated datum/checksum value to a hash of the module that was obtained during its installation or from a public repository.

When generating the integrity measurements (e.g., checksum value), the key distribution module may access and use privileged, private, protected, or restricted information (e.g., object code of the module, etc.). This is because the key distribution module is included in the same device as the module, has shared access to the memory used by the module, and is implemented or included in the same or higher security and privilege level/domain as the module. That is, generating the integrity measurements may require that the key distribution module access information that is not available to components that are external to the computing device (e.g., network servers) or to components that have not been granted sufficient privileges to access the portions of memory used by the module. For these and other reasons, in the various aspects the key distribution module may be included in the same computing device and at the same or higher protection/privilege level as the modules being measured, checked, evaluated, validated, or authenticated.

The key distribution module may be configured to generate a key or ticket that includes authentication information, integrity measurements (e.g., checksum, hash, etc.), a module identifier, process identifiers (PIDs), session key, timestamp, communication link information (e.g., operating system channel that is to be used, etc.), and other information about the module or how the module intends to communicate with other modules within the same computing device. For example, the key/ticket may include information identifying the communication methodology that is to be used to communicate information between the modules within the computing device. In addition, the key/ticket may include a pipe name or identifier, information identifying the channel that the operating system has allocated for the communication between modules within the computing device, information identifying the data structures, protocols, or message formats that are to be used to accomplish the data exchange or communication, information for establishing and accomplishing inter-process communications, and similar information.

By generating a key/ticket that includes the integrity measurements and data exchange/communication link information (in addition to the authentication information), the various aspects enable each module within the computing device to independently verify the integrity of the other modules within the computing device (and the integrity of the communication channel/link between the modules) using only the information included in the key/ticket. That is, unlike Kerberos and other network-based communication protocols, the various aspects include a key distribution module within the computing device that is configured to generate a key/ticket that is tied to the integrity of a module within the computing device that the key/ticket authenticates. As a result, the key/ticket ceases to authenticate the module as soon as the integrity of that module is compromised, such as when that the module's code or data is changed, updated, altered, manipulated or modified in the memory of the computing device. This allows each module within the computing device to use integrity measurements included in the key/ticket to accurately and efficiently verify the integrity of the other module within the computing device to determine whether the module and/or communication channel/link is secure and should be trusted.

In overview, an aspect method of performing secure inter-module communication in a computing device having a high level operating system may include a first process executing in the computing device providing a communication request message to a secure authentication process executing in a trusted portion of the computing device, and the secure authentication process performing an integrity check of the first process by accessing a portion of a memory of the computing device allocated to the first process by the high level operating system to generate a cryptographic measurement. The secure authentication process may generate a key in response to authenticating the first processing, the key including the cryptographic measurement, and provide the key to the first process. The first process may provide a second communication request message including the key to a second process executing in the computing device. The second process may authenticate the first process based on the cryptographic measurement included in the key, and communicate with the first process only when the cryptographic measurement included in the key indicates that the first process can be trusted. In an aspect, the secure authentication process may generate the key to include information about a communication channel allocated to the first process by the high level operating system. In an aspect, the second process may perform the integrity check of the first process by generating a cryptographic hash of the first process. In an aspect, the second process may authenticate the first process based on the cryptographic measurement included in the key by comparing the cryptographic hash of the first process to a hash obtained from a public repository.

The various aspects may be implemented on a number of single processor and multiprocessor computer systems, including a system-on-chip (SOC). FIG. 1 illustrates an example system-on-chip (SOC) 100 architecture that may be used in computing devices implementing the various aspects. The SOC 100 may include a number of heterogeneous processors, such as a digital signal processor (DSP) 103, a modem processor 104, a graphics processor 106, and an application processor 108. The SOC 100 may also include one or more coprocessors 110 (e.g., vector coprocessor) connected to one or more of the heterogeneous processors 103, 104, 106, 108. Each processor 103, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser) running on a computing device.

The system components and resources 116 and/or custom circuitry 114 may include circuitry to interface with peripheral devices, such as cameras, electronic displays, wireless communication devices, external memory chips, etc. The processors 103, 104, 106, 108 may be interconnected to one or more memory elements 112, system components and resources 116, and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 103, a modem processor 104, a graphics processor 106, an applications processor 108, etc.).

In an aspect, the SOC 100 may be included in a mobile device 102, such as a smartphone. The mobile device 102 may include communication links for communication with a telephone network, the Internet, and/or a network server. Communication between the mobile device 102 and the network server may be achieved through the telephone network, the Internet, private network, or any combination thereof.

In various aspects, the SOC 100 may be configured to collect behavioral, state, classification, modeling, success rate, and/or statistical information in the mobile device, and send the collected information to the network server (e.g., via the telephone network) for analysis. The network server may use information received from the mobile device to generate, update or refine classifiers or data/behavior models that are suitable for use by the SOC 100 when identifying and/or classifying performance-degrading mobile device behaviors. The network server may send data/behavior models to the SOC 100, which may receive and use data/behavior models to identify suspicious or performance-degrading mobile device behaviors, software applications, processes, etc.

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the mobile device 102 and SOC 100 discussed above, the various aspects may be implemented in a wide variety of computing systems, which may include a single processor, multiple processors, multicore processors, or any combination thereof.

Figure 2A:
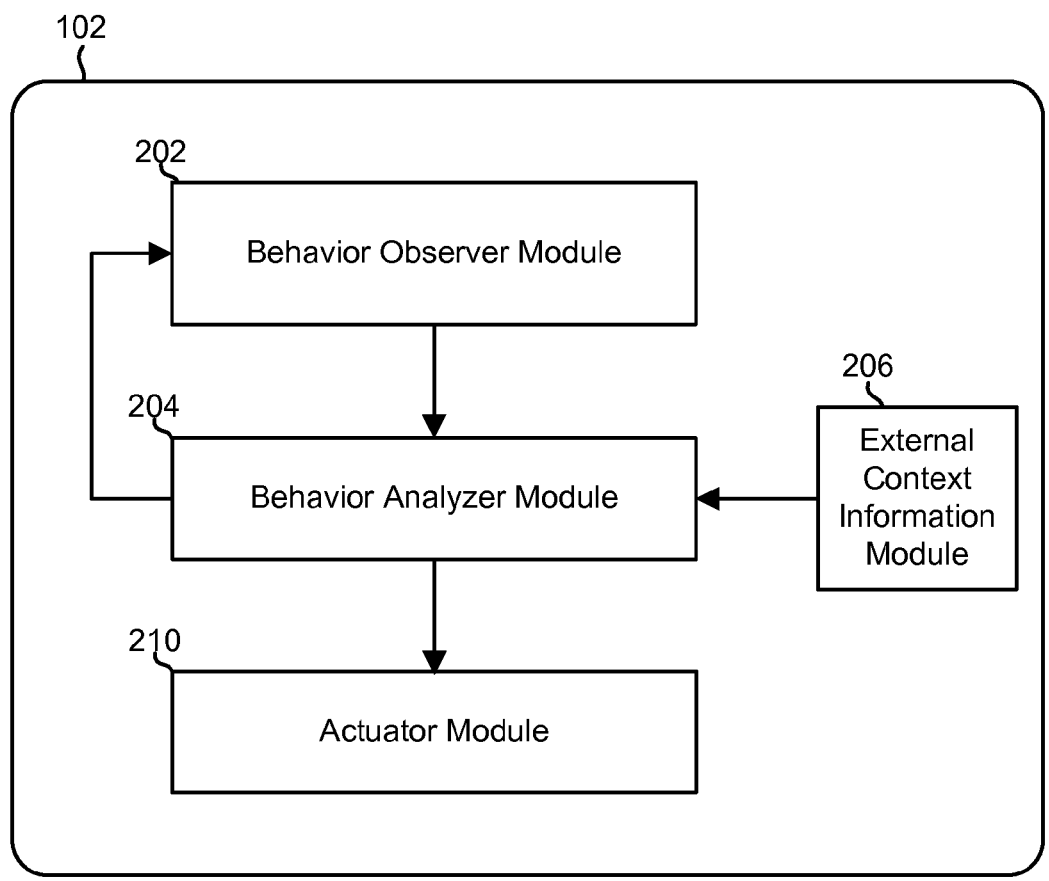
FIG. 2A is a block diagram illustrating example logical components and information flows in an aspect mobile device configured to determine whether a particular mobile device behavior, software application, or process is malicious, performance-degrading, suspicious, or benign.

FIG. 2A illustrates example logical components and information flows in an aspect mobile device 102 configured to determine whether a particular mobile device behavior, software application, or process is malicious/performance-degrading, suspicious, or benign. In the example illustrated in FIG. 2A, the mobile device 102 includes a behavior observer module 202, a behavior analyzer module 204, an external context information module 206, and an actuator module 210.

Each of the modules 202-210 may be implemented in software, hardware, or any combination thereof. In various aspects, the modules 202-210 may be implemented within parts of the operating system of the computing device (e.g., within the kernel, in the kernel space, in the user space, etc.), within separate programs or applications, in specialized hardware buffers or processors within the computing device, or any combination thereof. In an aspect, one or more of the modules 202-210 may be implemented as software instructions executing on one or more processors of the mobile device 102.

In an aspect, the mobile device 102 may include a secure computing environment. The secure computing environment may include a secured portion, an unsecured portion, a privileged portion, and an unprivileged portion. In an aspect, the unprivileged portion may be the user space of the operating system kernel, and the privileged portion may be the kernel space of the operating system kernel. In the various aspects, each of the modules 202-210 may be included in any combination of the various security, protection, and privilege domains of the secure computing environment. For example, in an aspect, the behavior observer module 202 may be implemented in a privileged-unsecured portion of the secure computing environment (e.g., kernel space), and the behavior analyzer module 204 and actuator module 210 may be included in an unprivileged-unsecured portion of the secure computing environment (e.g., user space).

The behavior observer module 202 may be configured to instrument or coordinate APIs at various levels/modules of the mobile device, monitor or observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or provide (e.g., via memory writes, function calls, IPC, etc.) the generated observations to the behavior analyzer module 204. In an aspect, the behavior observer module 202 may be configured to perform cross-layer observations on various mobile device modules and sub-systems encompassing webkit, SDK, NDK, kernel, drivers, and hardware in order to characterize the mobile device behavior.

The behavior observer module 202 may be configured to monitor/observe mobile device operations and events by collecting information pertaining to library application programming interface (API) calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may monitor/observe data network activity, which may include types of connections, protocols, port numbers, server/client that the device is connected to, the number of connections, volume or frequency of communications, etc. The behavior observer module 202 may also be configured to monitor phone network activity, which may include monitoring the type and number of calls or messages (e.g., SMS, etc.) sent out, received, or intercepted (e.g., the number of premium calls placed).

The behavior observer module 202 may monitor/observe the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the computing device.

The behavior observer module 202 may also monitor/observe one or more hardware counters that denote the state or status of the computing device and/or mobile device sub-systems. A hardware counter may include a special-purpose register of the processors/cores that is configured to store a count or state of hardware-related activities or events occurring in the computing device.

To reduce the number of factors monitored to a manageable level, in an aspect, the observer module 202 may be configured to perform coarse observations by monitoring/observing an initial set of behaviors or factors that are a small subset of all factors that could contribute to the mobile device's degradation. In various aspects, the behavior observer module 202 may receive the initial set of behaviors and/or factors from a network server, a component in a cloud service or network, or from the analyzer module 204. In an aspect, the behavior observer module 202 may select the initial set of behaviors/factors based on information collected from previously observed and/or analyzed behaviors of the mobile device.

The behavior observer module 202 may constantly (or near constantly) monitor the mobile device (e.g., via a low power process, background processes, etc.) to identify the normal operation patterns of the mobile device and/or to identify behaviors that are not consistent with previously computed normal operational patterns. In an aspect, the behavior observer module 202 may be configured to generate concise behavior vectors from the collected behavior information. The concise behavior vector may include information suitable for characterizing a complex mobile device behavior in a reduced format.

The behavior observer module 202 may be configured to generate concise behavior vectors that include a succinct definition of the observed behaviors. Thus, each concise behavior vector may succinctly describe observed behavior of the mobile device, software application, or process in a value or vector data-structure (e.g., in the form of a string of numbers, etc.). In various aspects, the concise behavior vector may be a vector of numbers, a behavior pattern expressed as a vector, a regular expression of APIs, a sequence (<api1, api2, . . . apin>), a state diagram, or in any other concise structure or format that reduces the amount of memory required to store a large volumes of information. The concise behavior vector may also function as an identifier that enables the mobile device system to quickly recognize, identify, and/or analyze mobile device behaviors. In an aspect, the behavior observer module 202 may generate the concise behavior vector to include a series of numbers, each of which signifies a feature or a behavior of the mobile device. For example, numbers included in such a behavior vector may signify whether a camera of the mobile device is in use (e.g., as zero or one), how much network traffic has been transmitted from or generated by the mobile device (e.g., 20 KB/sec, etc.), how many Internet messages have been communicated (e.g., number of SMS messages, etc.), etc.

The behavior observer module 202 may communicate (e.g., via a memory write operation, function call, etc.) the generated behavior vectors or collected behavior information to the behavior analyzer module 204, which may analyze and/or classify the collected behavior information, generate or update behavior vectors, generate spatial and/or temporal correlations based on the generated behavior vectors and information collected from various other mobile device sub-systems, and determine whether a particular mobile device behavior, software application, or process is benign, suspicious, malicious, or performance-degrading. For example, the behavior analyzer module 204 may be configured to receive the observations from the observer module 202, compare the received information (i.e., observations) with contextual information received from the external context information module 206, and identify subsystems, processes, and/or applications associated with the received observations that are contributing to (or are likely to contribute to) the device's degradation over time, or that may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or that may otherwise cause problems on the device. For example, the behavior analyzer module 204 may be configured to analyze information (e.g., in the form of observations) collected from various modules (e.g., the observer module 202, etc.), learn the normal operational behaviors of the mobile device, generate one or more behavior vectors based the results of the comparisons, and compare the generated behavior vectors to one or more behavior modules to determine whether a particular mobile device behavior, software application, or process is performance-degrading/malicious, benign, or suspicious.

The behavior analyzer module 204 may be configured to perform real-time analysis operations, which may include applying data, algorithms, classifiers and/or behavior models to behavior information collected by the observer module to determine whether a mobile device behavior is benign, suspicious, or malicious/performance-degrading. In an aspect, the mobile device 102 may configured to generate the behavior models or classifiers as a function of a training dataset, which may include thousands of features and billions of entries. In an aspect, the mobile device may be configured to generate one or more behavior models or classifiers from a reduced training dataset that includes only the features/entries that are most relevant for determining whether a particular mobile device behavior, software application, or process is benign, suspicious, or malicious/performance-degrading.

The behavior analyzer module 204 may be configured so that, when the analyzer module 204 determines that a behavior is malicious or performance-degrading, the analyzer module 204 notifies the actuator module 210. The actuator module 210 may perform various actions or operations to correct mobile device behaviors determined to be malicious or performance-degrading and/or perform operations to heal, cure, isolate, or otherwise fix the identified problem.

In an aspect, the behavior analyzer module 204 may be configured to determine that a mobile device behavior, software application, or process is suspicious in response to determining that the analyzer/classifier does not have sufficient information to classify or conclusively determine that the behavior/application/process is benign or not benign. The behavior analyzer module 204 may also be configured to notify the behavior observer module 202 when it determines that a behavior is suspicious. In response, the behavior observer module 202 may adjust the adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and provide the new/additional information to the behavior analyzer module 204 for further analysis/classification.

Such feedback communications between the observer module 202 and the analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communications also enable the mobile device 102 to adjust or modify the data/behavior models locally in the mobile device without consuming an excessive amount of the mobile device's processing, memory, or energy resources.

Figure 2B:
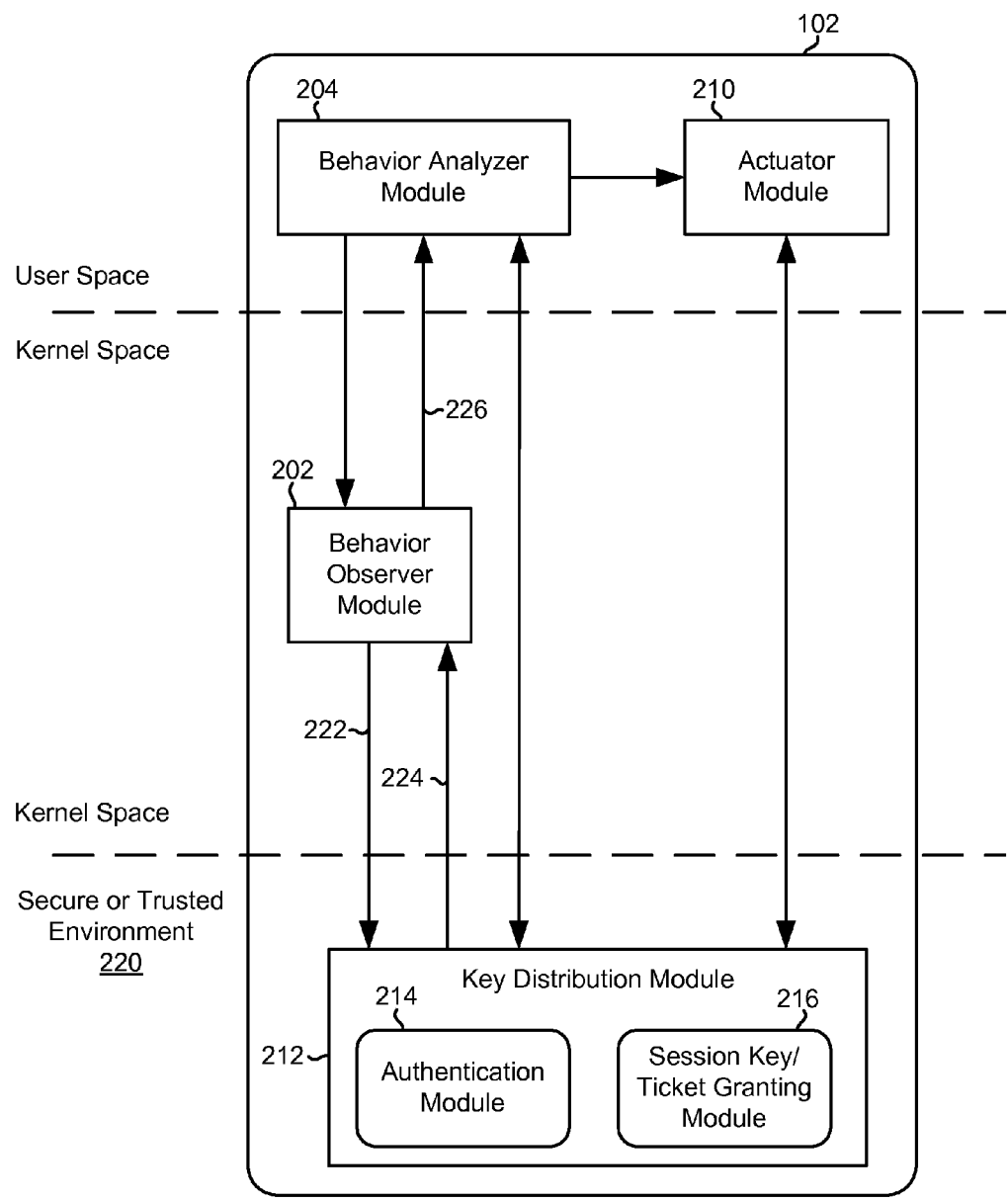
FIG. 2B is a block diagram illustrating example logical components and information flows in an aspect mobile device equipped with a secure computing environment having multiple privilege/protection domains and which may be configured to securely determine whether a particular mobile device behavior, software application, or process is malicious, performance-degrading, suspicious, or benign.

FIG. 2B illustrates example logical components and information flows in an aspect mobile device 102 equipped with a secure computing environment 220 having multiple privilege/protection domains. The mobile device may include a secure behavioral observation and analysis system that includes a plurality of modules 202-216, each of which is included in one of the various privilege/protection domains of the secure computing environment.

Specifically, the mobile device 102 includes a behavior observer module 202, a behavior analyzer module 204, an actuator module 210, and a key distribution module 212. The key distribution module 212 includes an authentication module 214 and a session key/ticket granting module 216. The key distribution module 212, authentication module 214, and session key/ticket granting module 216 are included in the kernel space of the operating system kernel and/or in a secured portion of the trusted execution environment 220, such as in an ARM TrustZone®. The behavior observer module 202 may be implemented or included in the kernel space of the operating system kernel and/or in a non-secured or normal portion of the trusted execution environment. The behavior analyzer module 204 and the actuator module 210 may be implemented or included in the user space of the operating system kernel and/or in the non-secured or normal portion of a trusted execution environment.

The behavior observer module 202 may collect behavior information from APIs at various levels of the mobile device system, and provide the behavior information to the behavior analyzer module 204. The behavior analyzer module 204 may analyze the behavior information and provide the results of its analysis to the actuator module 210. The behavior analyzer module 204 may also provide feedback information to the behavior observer module 202. To secure these and other communications between these modules, the modules may request a key or ticket from the key distribution module 212 before establishing a communication link, channel, or pipe to provide and/or receive information to or from the other module.

For example, in operation 222, the behavior observer module 202 may request a key or ticket from the key distribution module 212, which may be accomplished by providing an authentication request message to the key distribution module 212. The key distribution module 212 may receive the authentication request message and authenticate the behavior observer module 202 based on information included in the received message. The key distribution module 212 may also perform an integrity measurement by reading a shared memory and/or performing a checksum of the contents of the portions of the mobile device memory that store or are used by the behavior observer module 202. The key distribution module 212 may generate a key or ticket that stores/includes the integrity measurements (e.g., checksum, hash, etc.), as well as communication link information, authentication information, module identifiers, process identifiers (PIDs), a session key, a timestamp, and other similar information.

In operation 224, the key distribution module 212 may provide the key/ticket to the behavior observer module 202. In operation 226, the behavior observer module 202 may provide a communication request message and the key/ticket to the behavior analyzer module 204. The behavior analyzer module 204 may receive and use information included in the key/ticket to authenticate the behavior observer module 202.

Thus, unlike Kerberos and other existing network-based communication protocols, the key distribution module 212 generates a key/ticket that is tied to the integrity of the module it authenticates. This allows each module 202, 204 within the mobile device to use the integrity measurements included in the key to accurately and efficiently determine whether the other module 202, 204 within the mobile device is secure and should be trusted.

Figure 3A:
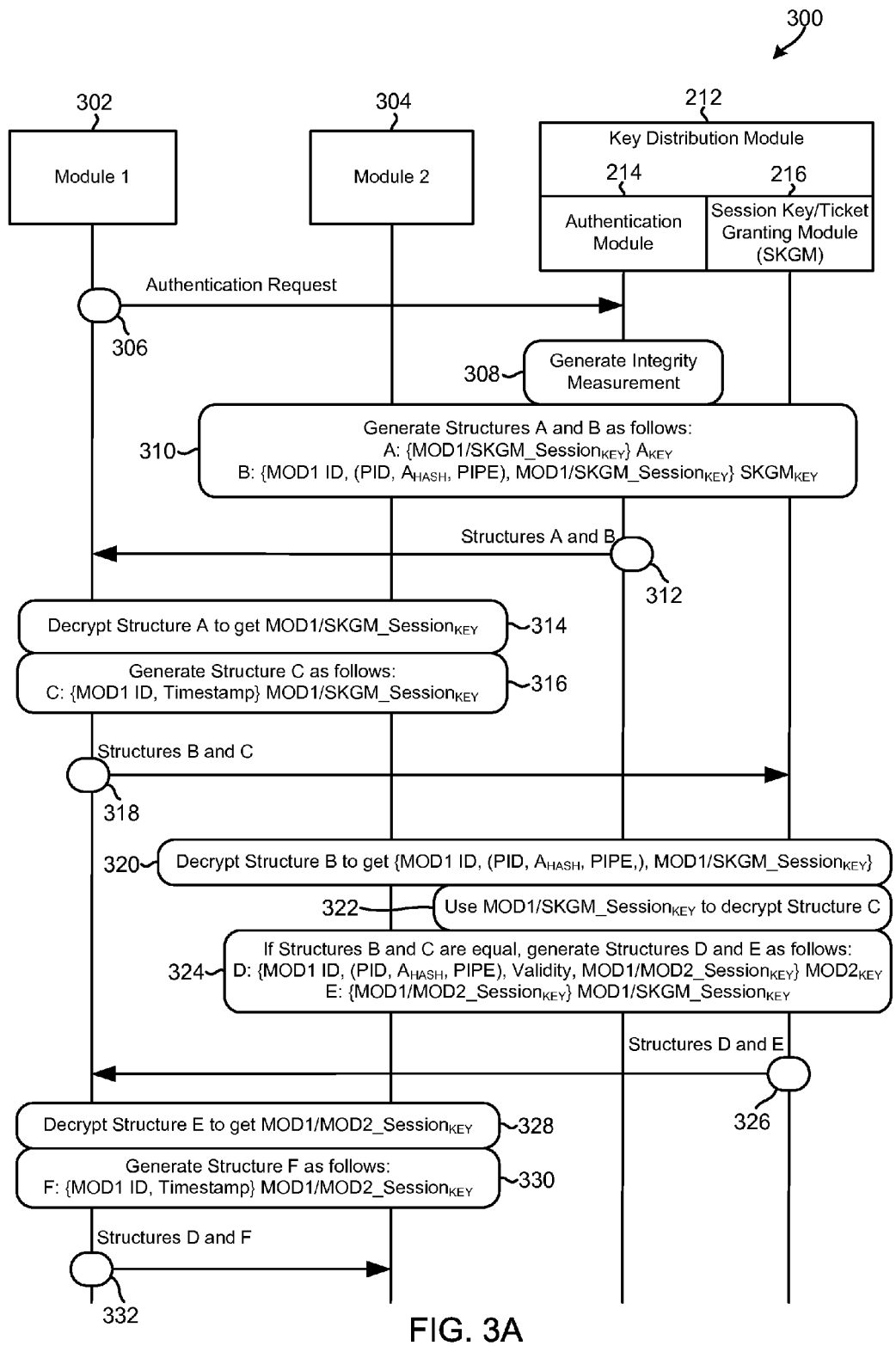
FIGS. 3A and 3B are block diagrams illustrating example logical components and information flows in an aspect system configured to secure communications between a first module in a computing device and a second module in the computing device.
Figure 3B:
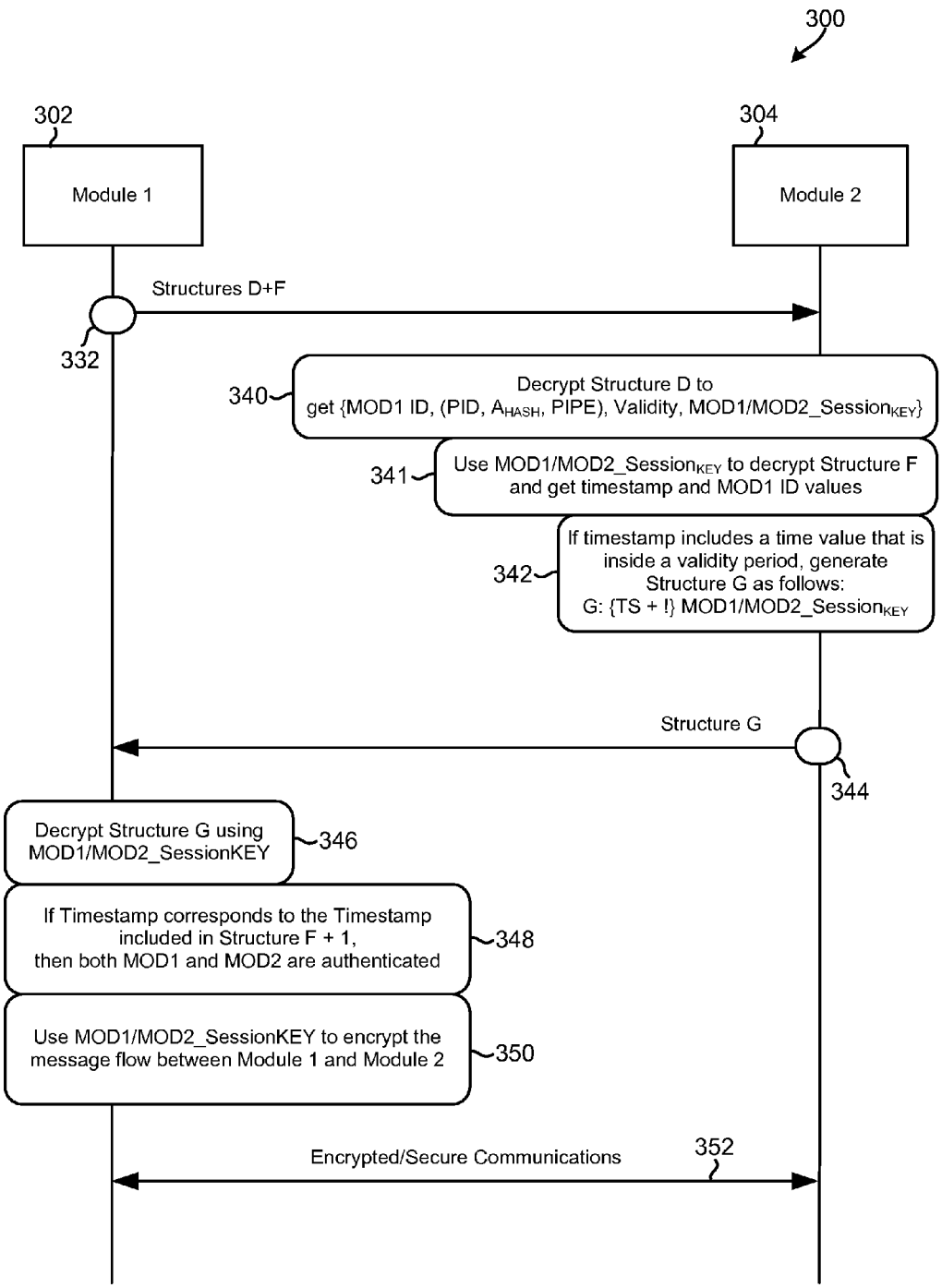

FIGS. 3A-3B illustrate various logical components and information flows in an aspect method 300 of securing communications between a first module 302 and a second module 304 within the same computing device. Method 300 may be performed by a processing core in a computing device.

In block 306, a first module 302 that is operating within a normal or non-secured portion of a secure operating environment executing within the processing core may provide (e.g., via a memory write operation to a secure buffer, etc.) an authentication request to an authentication module 214 that is part of a key distribution module 212 and operating within a secured portion of a secure operating environment executing within the same or another processing core of the computing device. The authentication request may be any structure that is suitable for storing and organizing information so that it may be communicated between modules in the computing device, including a communication message, vector, list, array, etc. In an aspect, the authentication request may be generated to include an identifier (MOD ID) of the first module 302 and information pertaining to a communication pipe (PIPE) that has been allocated to the first module 302 by an operating system of the computing device.

In block 308, the authentication module 214 may perform an integrity check of the first module 302, which may include taking/performing a cryptographic measurement of the first module 302 to generate an integrity measurement value, such as a cryptographic hash or a checksum value. For example, in block 308, the authentication module 214 may generate a checksum or hash value ($A_{HASH}$) of the contents of the portions of memory that are associated with, or used by, the first module 302. The authentication module 214 may then compare the generated checksum or hash value ($A_{HASH}$) to a hash of the first module 392 that was obtained during installation of the first module 302 and stored in the memory of the computing device to verify that authentication request originated from the first module 302 and that the first module 302 has not been improperly modified.

In operation 310, the authentication module 214 may generate a first data structure (Structure A) and a second data structure (Structure B) in response to determining that the authentication request originated from the first module 302 and the first module 302 has not been improperly modified. These data structures may be any known data-structure, communication message or protocol that is known in the art or suitable for communicating information between modules within a computing device. In an aspect, the first and second data structures (Structures A and B) may be packaged in another data structure that is suitable for communicating the information included in first and second data structures to the first module 302.

The authentication module 214 may generate the first data structure (Structure A) to include a first session key (Mod1/SKGM_Session$_{KEY}$) that is suitable for authenticating the first module 302 to session key/ticket granting module (SKGM) 216. The authentication module 214 may encrypt the first data structure (Structure A) using a first encryption key ($A_{KEY}$) that corresponds to a decryption key that is stored in a private memory location that is accessible to the first module 302.

The authentication module 214 may generate the second data structure (Structure B) to include information about the first module 302 itself, including the module identifier (MOD1 ID), its process id (PID), the generated cryptographic checksum or hash value ($A_{HASH}$), and information pertaining to the communication pipe (PIPE) allocated to the first module 302. The authentication module 214 may also generate the second data structure to include the first session key (Mod1/SKGM_Session$_{KEY}$). The authentication module 214 may encrypt the second data structure (Structure B) using a second encryption key (SKGM$_{KEY}$) that corresponds to a decryption key that is stored in a secured and private memory location that is accessible to the session key/ticket granting module 216.

In block 312, the authentication module 214 may pass or communicate (e.g., via memory read/write operations, inter-process communications, etc.) the generated first and second data structures (i.e., Structures A and B) to the first module 302.

In block 314, the first module 302 may receive the first and second data structures (i.e., Structures A and B), and decrypt the first data structure (Structure A) to obtain the session key (Mod1/SKGM_Session$_{KEY}$). This may be accomplished by using a decryption key that corresponds to the first encryption key ($A_{KEY}$) used to encrypt the first data structure (Structure A). In block 316, the first module 302 may generate a third data structure (Structure C) that includes the module identifier (MOD1 ID), a timestamp, and the session key (Mod1/SKGM_Session$_{KEY}$) obtained from the first data structure (Structure A).

In block 318, the first module 302 may communicate (e.g., via memory read/write operations, inter-process communications, etc.) the second and third data structures (i.e., Structures B and C) to a session key/ticket granting module 216 operating within a secured portion of a secure operating environment executing within the processing core of the computing device.

In block 320, the session key/ticket granting module 216 may receive the second and third data structures (i.e., Structures B and C), and decrypt the second data structure (Structure B) to obtain information about the first module 302. The session key/ticket granting module 216 may decrypt the second data structure (Structure B) using a decryption key that corresponds to the second encryption key (SKGM$_{KEY}$) used to encrypt the second data structure (Structure B).

In the example illustrated in FIG. 3A, the session key/ticket granting module 216 retrieves from second data structure (Structure B) information that includes the first module's identifier (MOD1 ID), its process id (PID), its checksum or hash value ($A_{HASH}$), information pertaining to the communication pipe (PIPE) allocated to the first module 302, and the first session key (Mod1/SKGM_Session$_{KEY}$).

In block 322, the session key/ticket granting module 216 may use the first session key (Mod1/SKGM_Session$_{KEY}$) extracted/retrieved from the second data structure (Structure B) to decrypt the third data structure (Structure C).

In block 324, the session key/ticket granting module 216 may compare the second and third data structures to determine whether these structures are the same or equal. This may be accomplished by comparing these structures for reference equality, for value equality, by comparing one or more values included in the structures, by comparing one or more characteristics of the structures (e.g., length, number of fields, etc.), or via any other known object or structure comparison method known in the art. If the session key/ticket granting module 216 determines that the structures are the same or equal, the session key/ticket granting module 216 may generate a fourth data structure (Structure D) and a fifth data structure (Structure E).

The session key/ticket granting module 216 may generate the fourth data structure (Structure D) to include information about the first module 302, including the first module's identifier (MOD1 ID), its process id (PID), the generated checksum or hash value ($A_{HASH}$), and information pertaining to the communication pipe (PIPE) allocated to the first module 302. The fourth data structure (Structure D) may be generated to further include a second session key (Mod1/Mod2_Session$_{KEY}$) that is suitable for use in authenticating the first module 302 to the second module 304. The fourth data structure (Structure D) may be generated to also include a validity value. The validity value may include information that may be used by the second module 304 to verify that that the session key/ticket granting module 216 has verified the integrity of the first module 302 and/or the communication pipe (PIPE). The session key/ticket granting module 216 may encrypt the fourth message (Structure D) using an encryption key (MOD2$_{KEY}$) that may be decrypted by the second module 304.

The session key/ticket granting module 216 may generate the fifth data structure (Structure E) to include a second session key (Mod1/Mod2_Session$_{KEY}$) that is suitable for authenticating the first module 302 to the second module 304. The session key/ticket granting module 216 may encrypt the fifth message (Structure E) using the first session key (i.e., Mod1/SKGM_Session$_{KEY}$)

In block 326, the session key/ticket granting module 216 may provide the fourth and fifth data structures (Structures D and E) to the first module 302.

In block 328, the first module 302 may receive the fourth and fifth data structures (Structures D and E), and decrypt the fifth data structure (Structure E) to obtain the second session key (Mod1/Mod2_Session$_{KEY}$). This may be accomplished by using a decryption key that corresponds to the first session key (i.e., Mod1/SKGM_Session$_{KEY}$) received from the authentication module 214 in block 312.

In block 330, the first module 302 may generate a sixth data structure (Structure F) that includes the identifier of the first module 302 (MOD1 ID), a timestamp, and the second session key (Mod1/Mod2_Session$_{KEY}$).

With reference to FIG. 3B, in block 332 of method 300, the first module 302 may communicate (e.g., via a memory write operation, etc.) the fourth and sixth data structures (Structures D and F) to a second module 304 that is operating within a normal or non-secured portion of a secure operating environment executing within the processing core.

In block 340, the second module 304 may receive the fourth and sixth data structures (Structures D and F), and decrypt the fourth data structure (Structure D) to obtain the second session key (Mod1/Mod2_Session$_{KEY}$) to obtain information about the first module 302, including the first module's identifier (MOD1 ID), its process id (PID), the generated checksum or hash value ($A_{HASH}$), and information pertaining to the communication pipe (PIPE) allocated to the first module 302. The second module 304 may also obtain the second session key (Mod1/Mod2_Session$_{KEY}$) and validity value from the fourth data structure (Structure D).

In block 341, the second module 304 may decrypt the fourth data structure (Structure D) to obtain a timestamp and first module's identifier (MOD1 ID). In block 342, the second module 304 may determine whether the timestamp includes a time value that within a validity period. The second module 304 may generate a seventh data structure (Structure G) that includes a timestamp value (TS), and encode the seventh data structure (Structure G) using the second session key (Mod1/Mod2_Session$_{KEY}$) in response to determining that the timestamp includes a time value that is within a validity period in block 342.

In block 344, the second module 304 may communicate the seventh data structure (Structure G) to the first module 302.

In block 346, the first module 302 may receive and decrypt the seventh data structure (Structure G) using the second session key (Mod1/Mod2_Session$_{KEY}$). In block 348, the first module 302 may determine whether the timestamp value (TS) included in the seventh data structure (Structure G) is consistent with, or equal to, the timestamp included in the sixth data structure (Structure F) and/or falls within the validity period. If the first module 302 determines that the timestamps are consistent or equal, in block 350, the first module 302 may use the second session key (Mod1/Mod2_Session$_{KEY}$) to encrypt structures and communicate these structures over a secure commutation pipe, channel, or link 352.

Figure 3C:
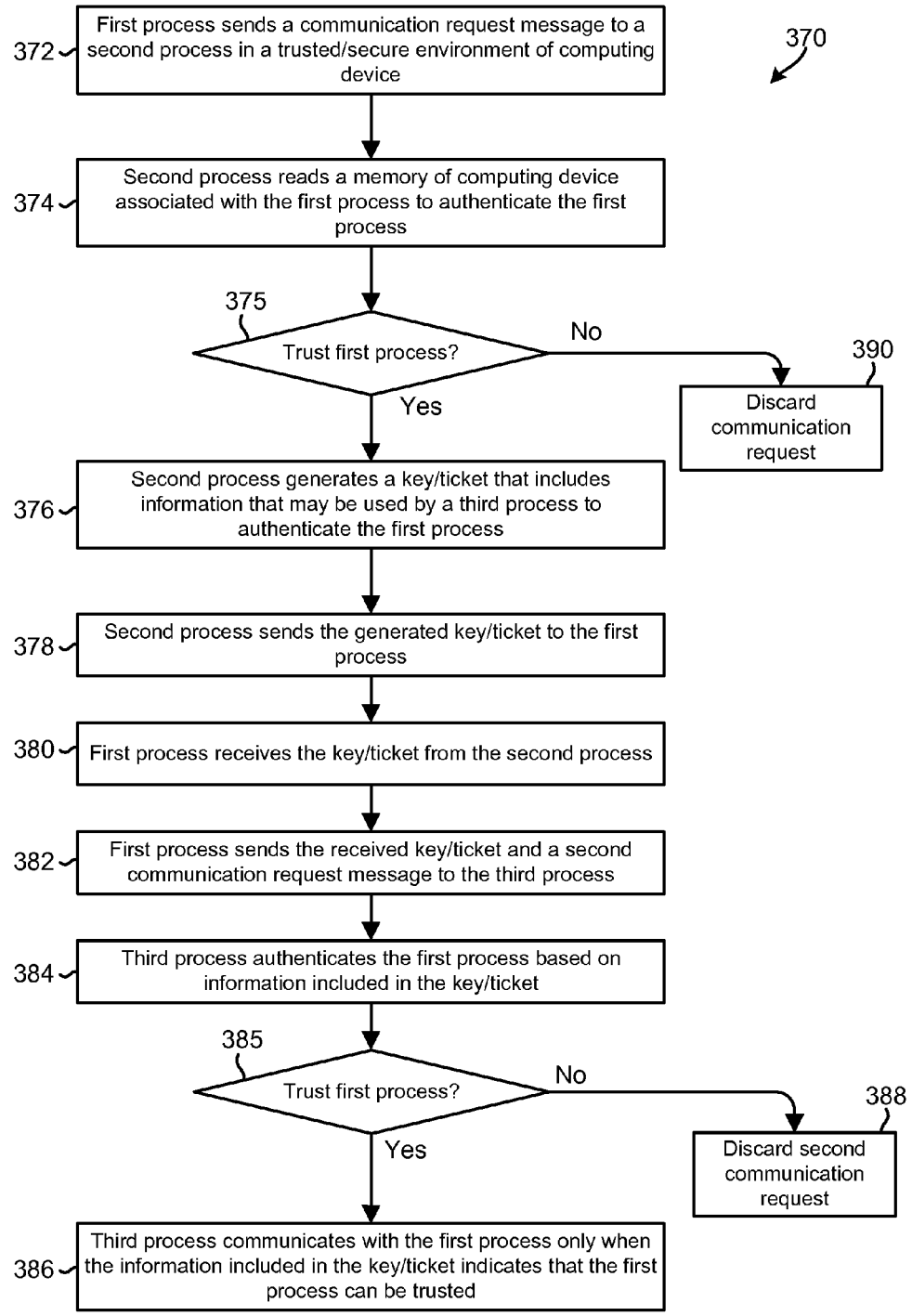
FIG. 3C is a process flow diagram illustrating an aspect method of securely communicating information between two modules in a computing device.

FIG. 3C illustrates an aspect method 370 of securely communicating information between two modules within a computing device. Method 370 may be performed in a processing core of a computing device.

In block 372 of method 370, a first process executing within the processing core may provide a communication request message to a second process operating in a trusted/secure environment of the processing core within the computing device. In various aspects, the second process may be a secure authentication module or the key distribution module 212 discussed above. The first process may be any of the modules discussed above, such as the behavior observer module 202 or the behavior analyzer module 204.

In block 374, the second process may read portions of memory in the computing device that are associated with the first process to authenticate the first process and/or perform an integrity check of the first process and determine whether the first process should be trusted in determination block 375. In an aspect, this may be accomplished by generating a hash of the contents of the memory and comparing the generated hash with control values stored in a memory of the mobile device.

If the second process determines that the first process is not valid, secure, or authentic (i.e., determination block 375="No"), the second process may discard the communication request message in block 390. On the other hand, if the second process determines that the first process is valid, secure, authentic, or otherwise should be trusted (i.e., determination block 375="Yes"), in block 376 the second process may generate a key or ticket that includes information that may be used by a third process to authenticate the first process and/or to validate the integrity of the first process, such as a checksum or hash. In block 378, the second process may provide the key/ticket to the first process.

In block 380, the first process may receive the key/ticket from the second process. In block 382, the first process may provide a second communication request message and the key/ticket to a third process operating within the processing core.

In block 384, the third process may authenticate the first process based on the information included in the key/ticket received from the first process to determine whether the first process should be trusted in determination block 385. If the third process determines that the first process is not valid, secure, or authentic (i.e., determination block 385="No"), the third process may discard the second communication request message in block 388.

If the third process determines that the first process is valid, secure, authentic, or otherwise should be trusted (i.e., determination block 385="Yes"), the third process may establish a secure communication link/channel/pipe that is suitable for providing and receiving information to and from the first process and communicates information over the secure communication link/channel/pipe in block 386.

Figure 4:
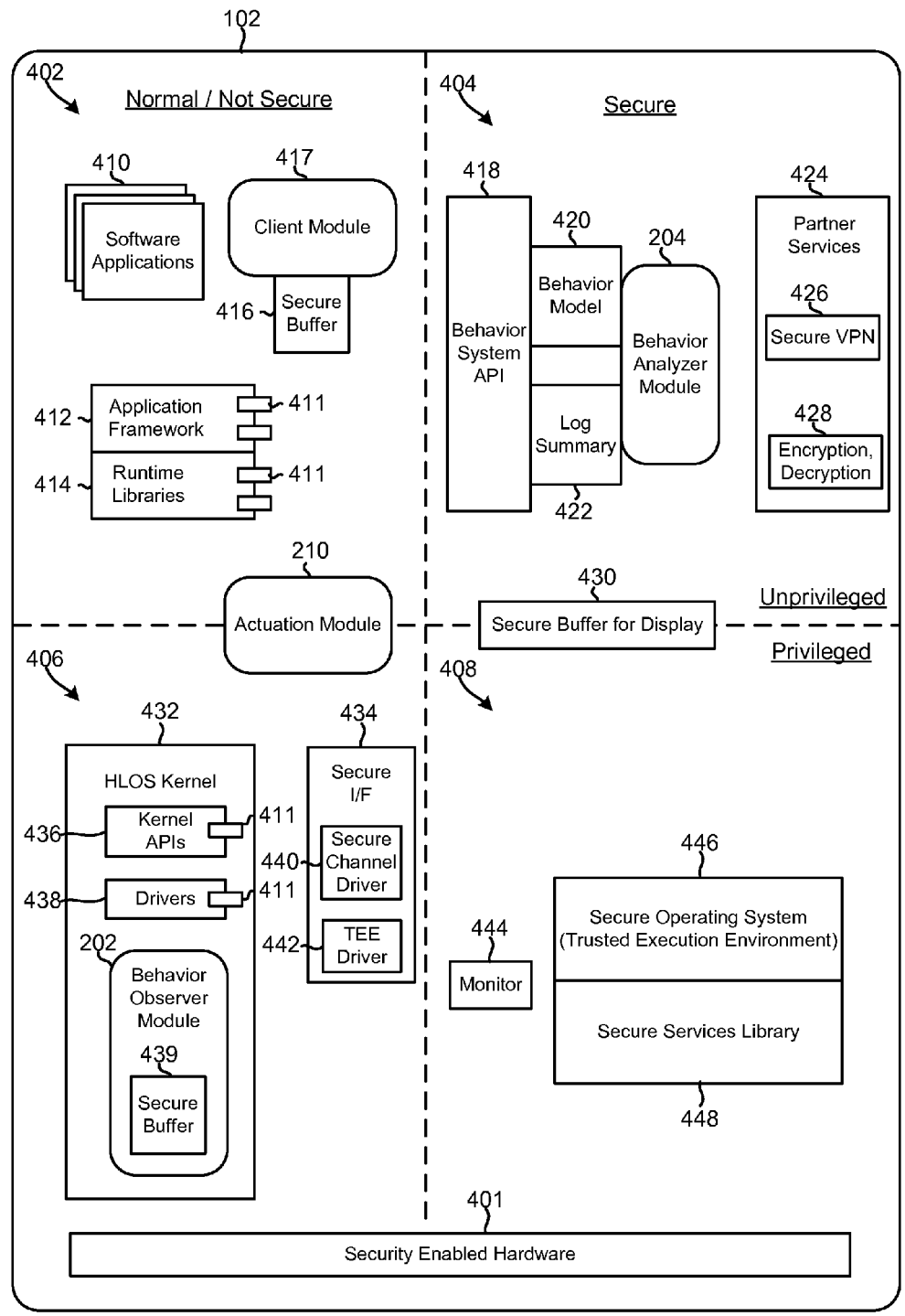
FIG. 4 is a block diagram illustrating additional example logical components and information flows in another aspect mobile device equipped with a secure computing environment having multiple privilege/protection domains that may be configured to securely determine whether a particular mobile device behavior, software application, or process is malicious, performance-degrading, suspicious, or benign.

FIG. 4 illustrates example logical components in an aspect mobile device configured to provide a secure and efficient system for identifying and correcting problematic mobile device behaviors and balance tradeoffs between mobile device security, performance, and power efficiency. In the example illustrated in FIG. 4, the mobile device 102 includes a secure computing environment that includes security enabled hardware 401 and software divided into four protection domains/portions, namely an unprivileged-normal portion 402, an unprivileged-secure portion 404, a privileged-normal portion 406, and a privileged-secure portion 408.

The unprivileged-normal portion 402 may include software applications 410, an application framework 412, runtime libraries 414, a secure buffer module 416, and a client module 417. In an aspect, the unprivileged-normal portion 402 may also include an actuation module 210. The secure buffer module 416 may be configured to enable communication between various logical components and across protection domains/portions. In an aspect, the secure buffer module 416 may be configured so that any module in any protection domain/portion 402-408 may write to its memory, but only modules in the secure portions 404, 408 may read the information stored in the memory. For example, the secure buffer module 416 may be configured so that the behavior observer module 202, the behavior analyzer module 204, and the partner services module 424 may write to its memory, but only the behavior analyzer module 204 and the partner services module 424 may read from its memory.

The unprivileged-secure portion 404 may include a behavior system API module 418, a behavior model module 420, a log summary module 422, and a behavior analyzer module 204. In an aspect, the unprivileged-secure portion 404 may further include a partner services module 424 that includes a secure virtual private network (VPN) module 424 and an encryption/decryption module 428. In an aspect, the unprivileged-secure portion 404 may also include a secure buffer for display 430, which may be suitable for communicating security-encrypted information generated in the unprivileged-secure portion 404 to an electronic display or display subsystem of the computing device. In an aspect, the unprivileged-secure portion 404 may be configured so that buffer control may be transferred directly to the display subsystem (not illustrated).

The privileged-normal portion 406 may include a high level operating system (HLOS) kernel 432 and secure infrastructure 434. The HLOS kernel 432 may include a kernel API module 436, a drivers module 438, and a behavior observer module 202, which may include a secure buffer 439. The secure infrastructure 434 may include a secure channel driver module 440 and a secure operating system or trusted execution environment driver module 442. In an aspect, the privileged-normal portion 406 may also include an actuation module 210. In an aspect, the secure buffer 439 may include or share a memory with the secure buffer 416.

The privileged-secure portion 408 may include a monitor module 444, a secure block system or trusted execution environment module 346, and a secure services library module 448. In an aspect, the privileged-secure portion 308 may also include a secure buffer for display 430.

In an aspect, the mobile device 102 may further include a secure file system (not illustrated) suitable for long term and secured storage of data and behavior models. In an aspect, the secure file system may be configured to store longer term data in encrypted form. In an aspect, the secure file system may be configured to store behavior models that are updated infrequently.

In an aspect, the mobile device 102 may further include a communication link (not illustrated in FIG. 4) suitable for communicating with a network server and/or a component in a cloud service or network. The communication link may be configured to support sending and receiving behavior models to and from an external server, which may be achieved in the unprivileged-secure portion 404 via the partner services module 424. For example, the secure VPN module 426 may receive encrypted behavior models from a network server, the encryption/decryption module 428 may decrypt the received behavior models in the unprivileged-secure portion 404 and provide the decrypted behavior models to the client module 417 in the unprivileged-normal portion 402.

The application framework 412, runtime libraries 414, kernel APIs 436, and drivers 438 may each include an instrumented API 411, which may be used by the behavior observer module 202 to collect behavior information from each respective module 412, 414, 436, 438. Further, since these module 412, 414, 438, and 202 are situated in the normal portions of the secure system, behavior information may be sent from components in the unprivileged-normal portion 402 to the behavior observer module 202 in the privileged-normal portion 406 with minimal latency and without consuming a significant amount of the processing and battery resources of the mobile device. In addition, by situating the behavior observer module 202 in the privileged-normal portion 406 (as opposed to the unprivileged portion 402), the behavior observer module 202 is protected from unauthorized access by user-level software applications 410, which may be malicious, buggy or otherwise contribute to the performance degradation of the mobile device.

Figure 5:
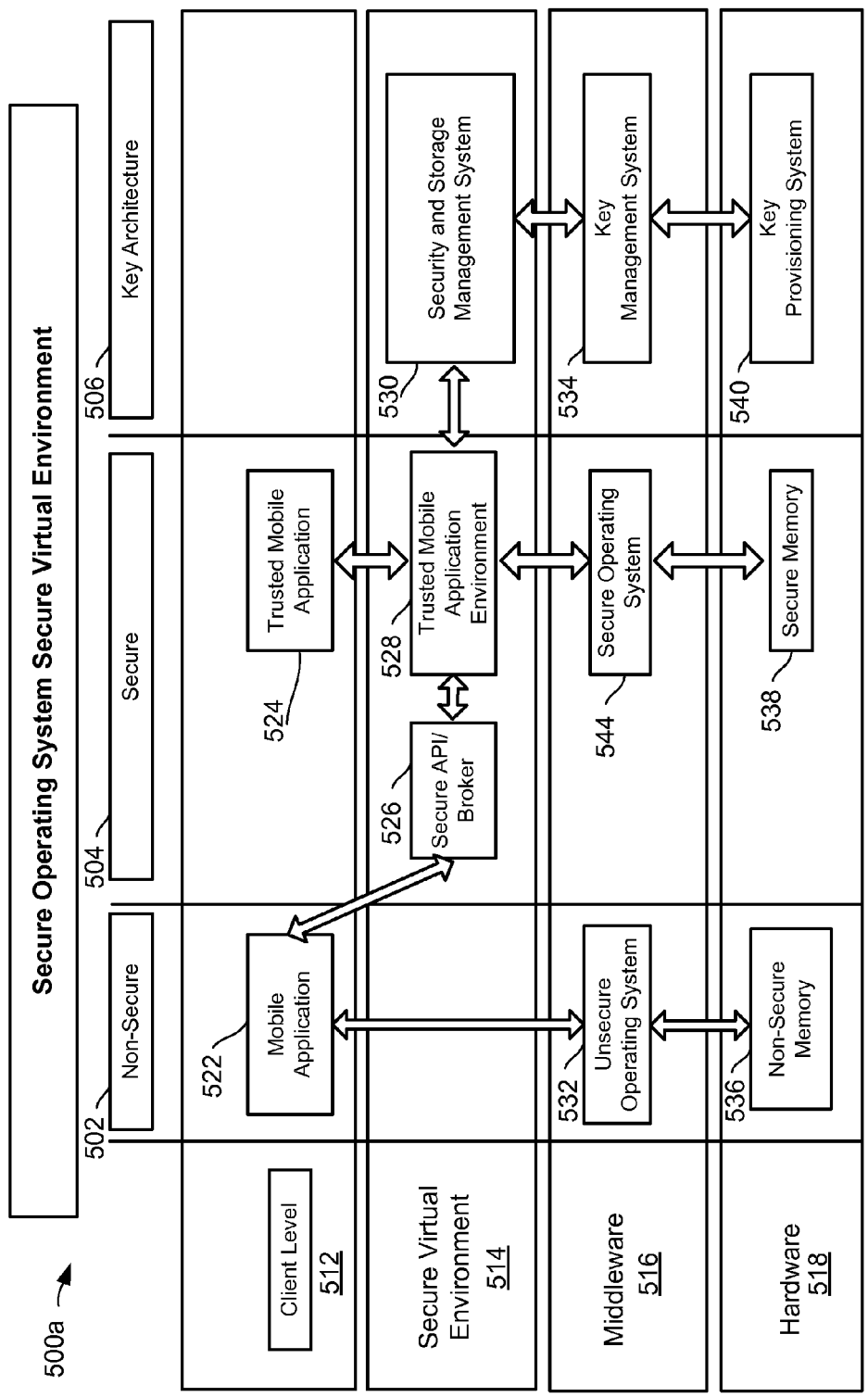
FIGS. 5-9 are system block diagrams of example trusted execution environments suitable for use with the various aspects.

FIGS. 5-10 illustrate example logical components and information flows in a secure computing environment suitable for implementing the various aspects. Referring to FIG. 5, the overall system architecture 500 may include three areas; a non-secure area 502, a secure area 504, and a key architecture 506. The non-secure area 502 represents unprotected areas in which security protocols are not applied, the secure area 504 represents protected areas in which security protocols are applied, and the key architecture area 506 represents the areas in which mobile device security keys operate.

The software levels of the system 500a may be broken down into a client level 512, a secure virtual environment 514, a middleware level 516, and a hardware level 518. Client level 512 software may include general mobile device software applications 522 and trusted mobile applications 524, which may be pre-authorized software provided by a third party or which is identified as complying with specific security and/or operability requirements.

The secure virtual area 514 may be a software level or run time environment established on a mobile device. The secure virtual area 514 may be established using a single application or a group of applications. The secure virtual environment 514 may contain a secure broker 526 that acts as a gate keeper for the secure virtual environment 514 and controls the operation of data and mobile applications 522 received from the non-secure area 502.

The secure broker 526 may allow application designers to create mobile applications 522 that can operate in the secure virtual environment 514. In this manner, application designers need not interact with the third party entity directly to produce or provide applications to mobile devices. That is, an application designer may create a mobile application 522 that meets the security requirements of the secure virtual environment 514 independent of the corporate entity.

A mobile device user may attempt to download or access the mobile application 522 stored in a non-secure area. In response, the secure broker 526 may determine whether the mobile application 522 meets the security and operability requirements for the specific secure virtual environment 514 established on the mobile device. Should the mobile application 522 meet the security and operability requirements, the mobile application 522 may be allowed to operate in the secure virtual environment 514 and be provided to the trusted mobile application environment 528. The trusted mobile application environment 528 may be an area of the secure virtual environment 514, including a GUI, in which the authorized applications operate. Should the mobile application 522 not meet the requirements of the secure broker 526, the mobile application 522 may be restricted from further interactions with the secure virtual environment 514.

Additionally the secure virtual environment 514 may include a security and storage management system 530 that interacts with the trusted mobile application environment 528 and the key management system 534 to provide necessary security and storage capability.

An unsecure operating system 532 may be provided on the mobile device in a non-secure area 502 and a non-secure memory 536 may be provided in a non-secure area 502. A mobile application 522 that does not meet the requirements of the secure broker 526 may only operate in the unsecure operating system 532 and may only write or read data to the non-secure memory 536.

Provided in the secure area 504 of the mobile device may be a secure operating system 544 and a secure memory 538. Trusted mobile applications 524 may be provided to the trusted mobile application environment 528. Trusted mobile applications 524, or mobile applications 522 that meet the requirements of the secure broker 526, may be provided to the secure operating system 544 through the trusted mobile application environment 528. Only applications in the trusted mobile application environment 528 interact with the secure operating system 544 and the secure memory 538. In the aspect illustrated in FIG. 5 the non-secure memory 536, the secure memory 538 and the key provisioning system 540 reside at the hardware level 518.

Figure 6:
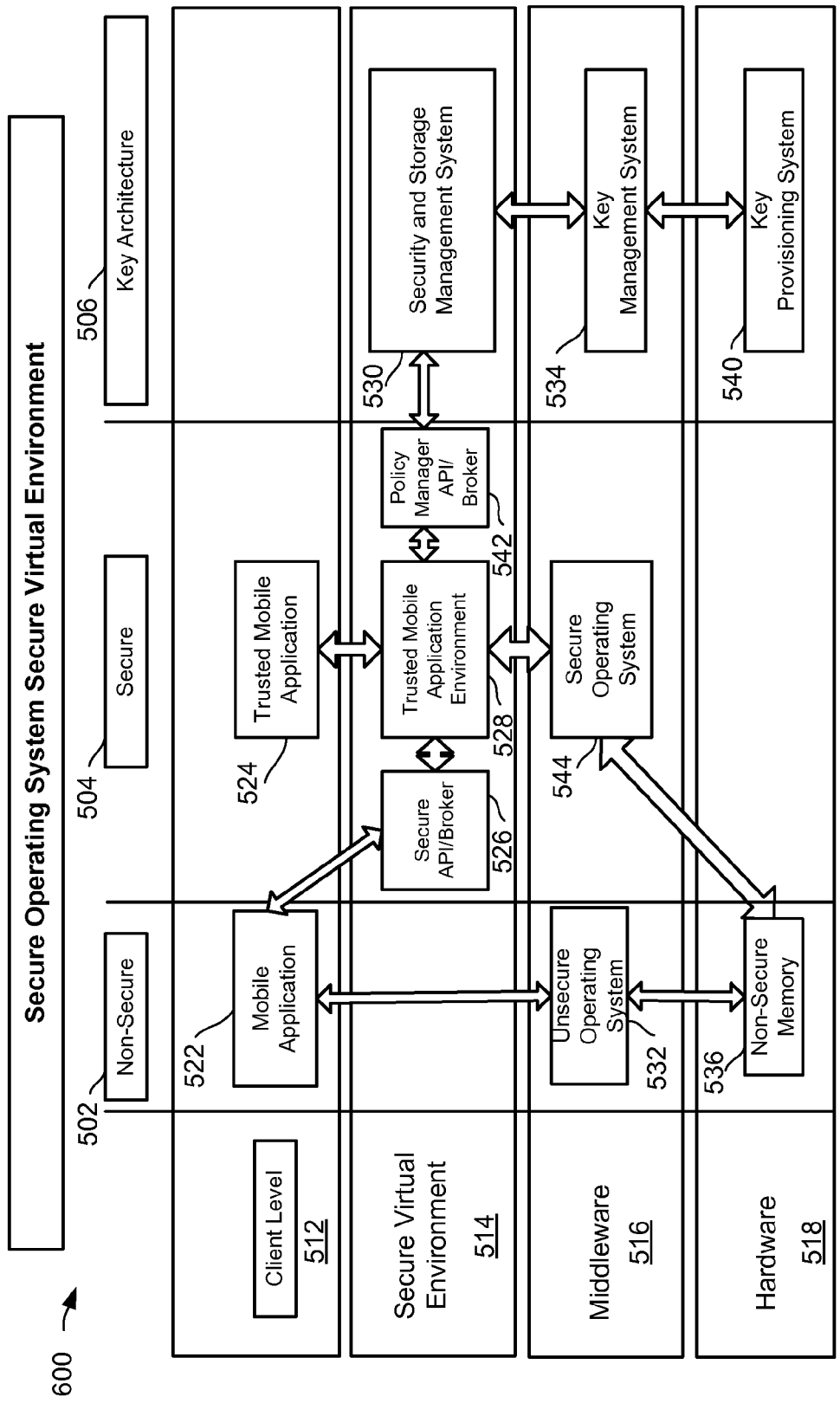

FIG. 6 illustrates another aspect architecture 600 that includes modules similar to those described above with respect to FIG. 5, and includes a policy manger broker 542 and a single memory 536 on the mobile device. In this aspect, the secure operating system 544 and the unsecure operating system 532 both store and read data on the non-secure memory 536. Data in the secure virtual environment 514 may be stored in an encrypted form when not in use by the trusted mobile application environment 528. The continual application of encryption at the data level by the secure virtual environment 514 ensures that secure data may be stored in a non-secure memory 536 because the secure data itself will be encrypted at the data level.

Figure 7:
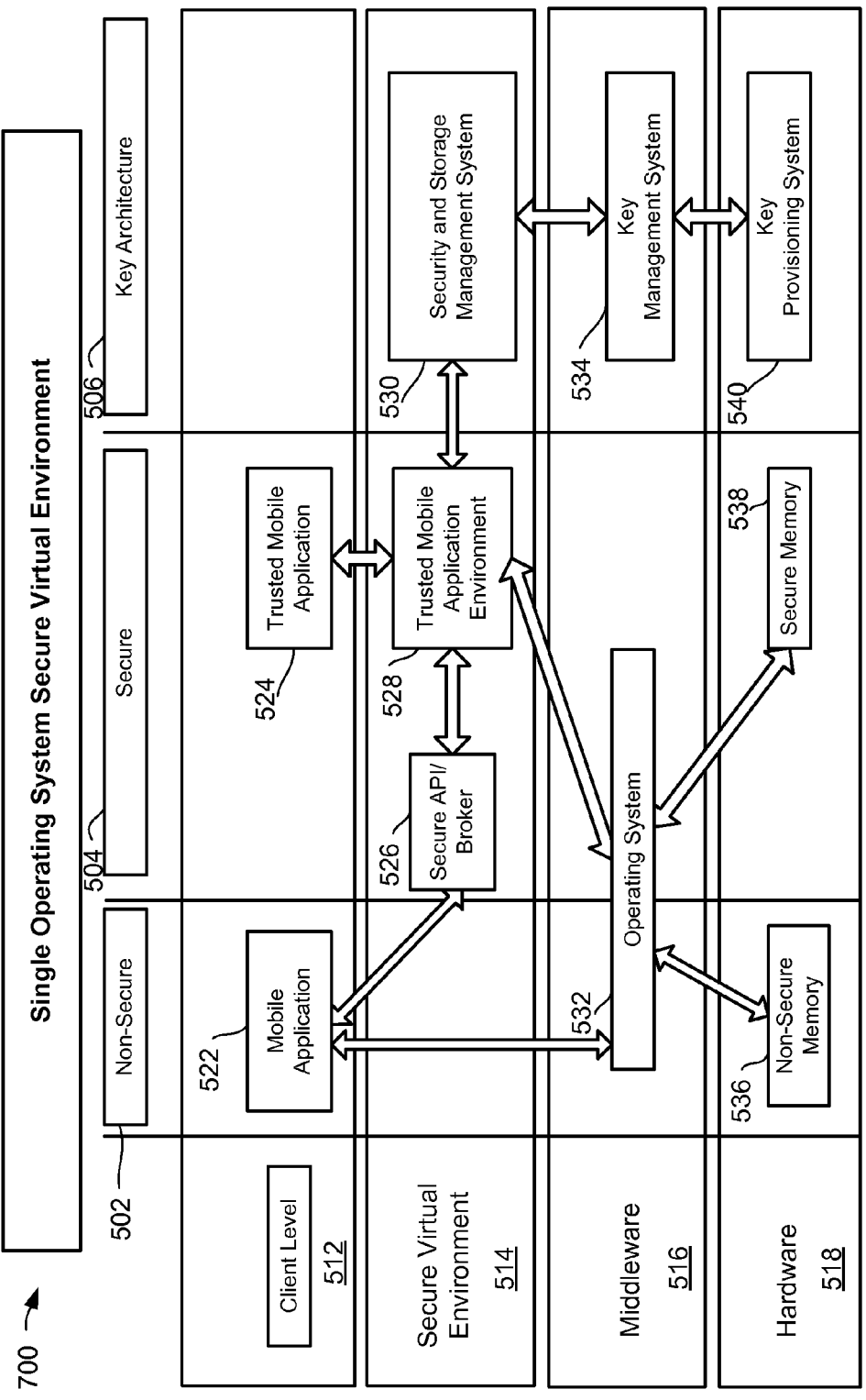
Figure 8:
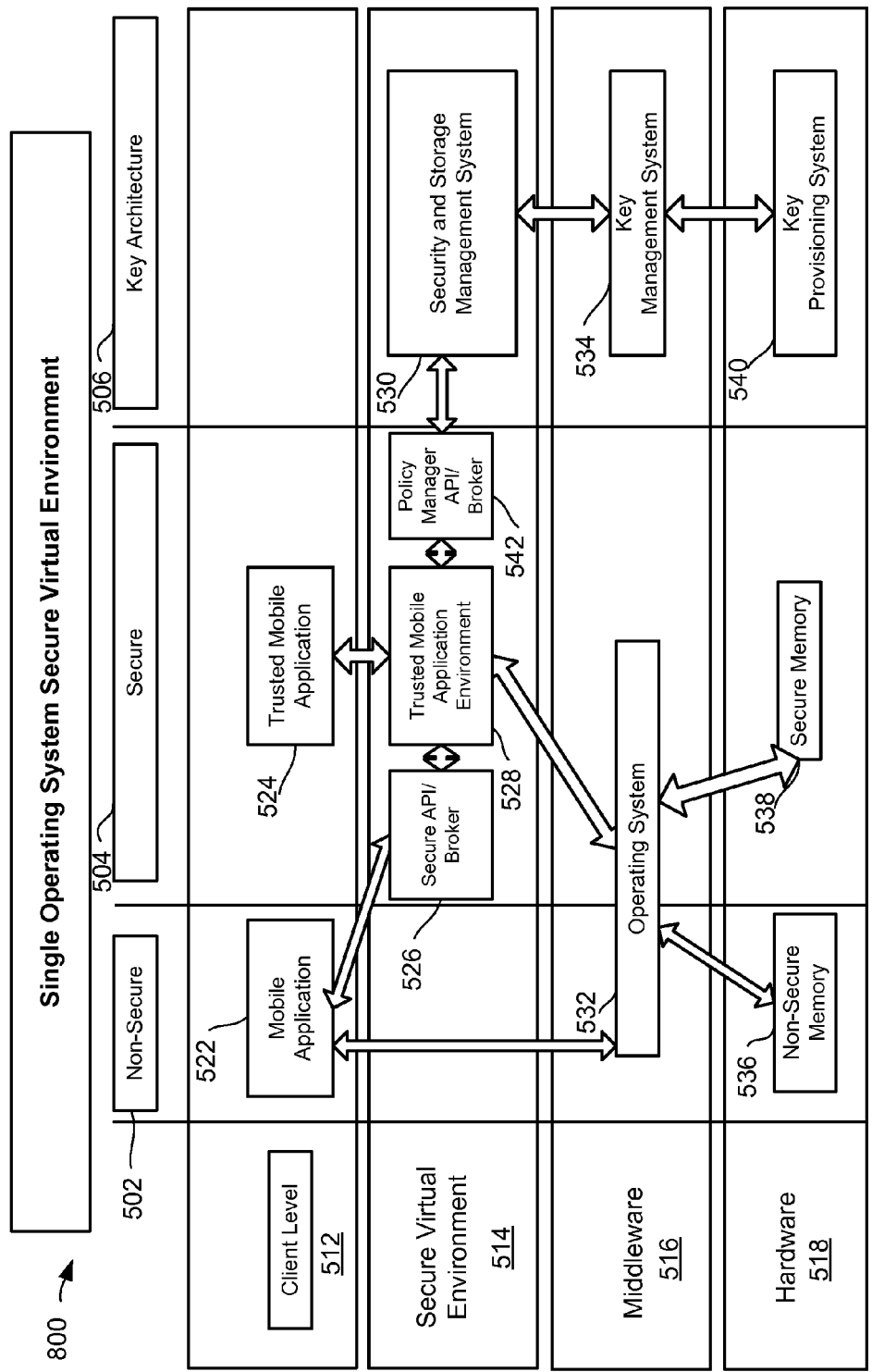
Figure 9:
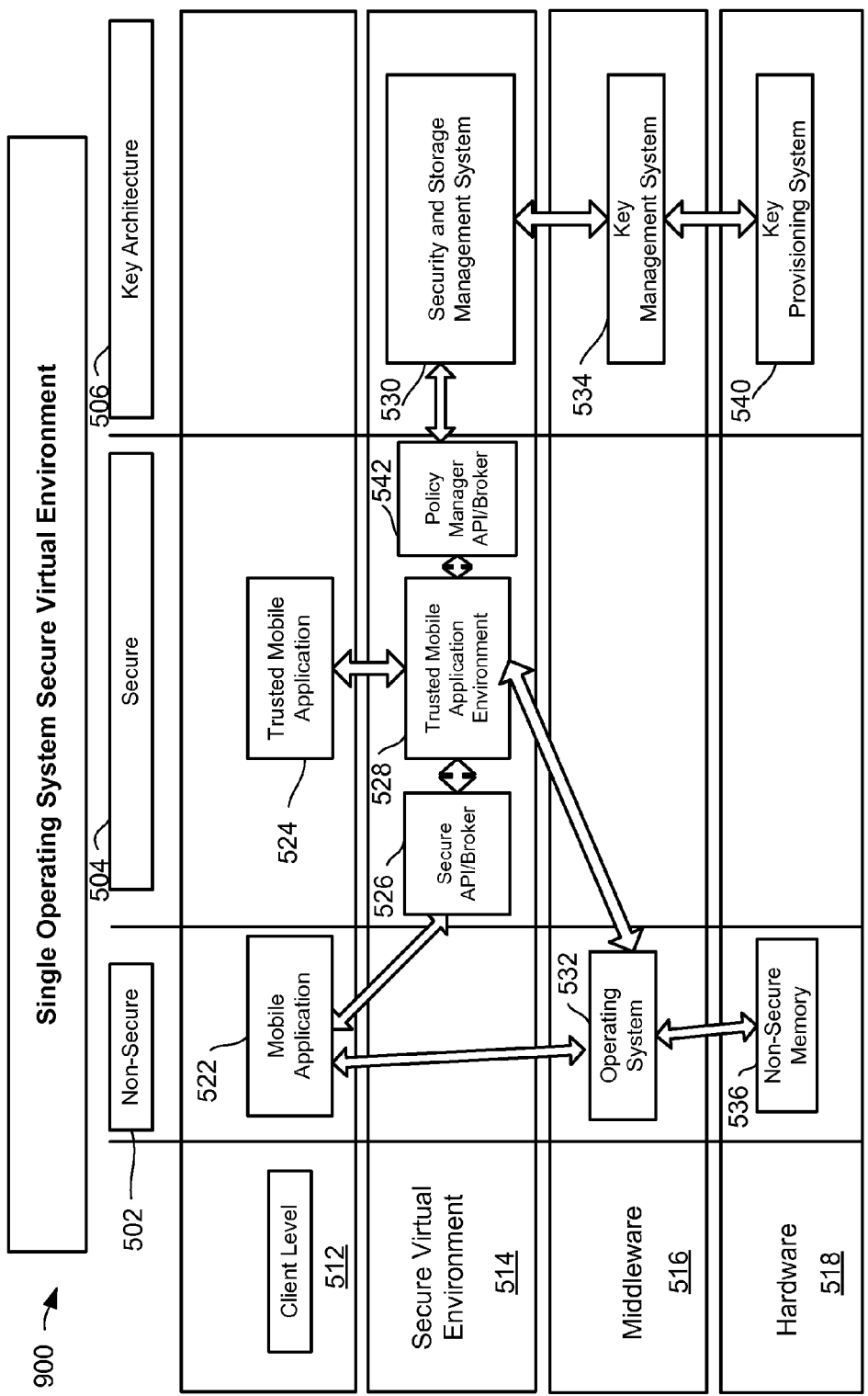

FIGS. 7-9 illustrate alternative aspects of a secure virtual environment in which a mobile device is configured with a single operating system. Referring to FIG. 7, the overall system architecture 700 may include three areas; a non-secure area 502, a secure area 504, and a key architecture 506. The non-secure area 502 represents unprotected areas in which security protocols are not applied. The secure area 504 represents protected areas in which security protocols are applied. The key architecture 506 represents the areas in which mobile device security keys operate.

The software levels of the system may be broken down into a client level 512, a secure virtual environment 514, a middleware level 516, and a hardware level 518.

Similar to the aspects discussed above, the client level 512 software includes mobile, or standard, applications 522 and trusted mobile applications 524, also referred to as trusted applications. Trusted mobile applications 524 may be applications specifically provided by the corporate entity that may be identified as meeting security requirements and authorized to handle corporate entity data and to operate on the corporate entity's networks and equipment. Trusted mobile applications 524 may be specific applications designed for the corporate entity or public applications that the corporate entity has previously established as meeting security requirements and operability requirements.

Similar to the aspects discussed above, the secure virtual area 514 may be a software level or run time environment established on a mobile device. The secure virtual area 514 may be established using a single application or a group of applications. The secure virtual environment 514 may contain a secure broker 526 that acts as a gate keeper for the secure virtual environment 514 and controls the operation of data and mobile applications 522 received from the non-secure area 502.

Similar to the aspects discussed above, the secure broker 526 may allow application designers to create mobile applications 522 that can operate in the secure virtual environment 514. In this manner, application designers need not interact with the corporate entity directly to produce applications, and provide applications to mobile devices. An application designer may create a mobile application 522 that meets the security requirements of the secure virtual environment 514 independent of the corporate entity.

Similar to the aspects discussed above, a mobile device user may attempt to download or access the mobile application 522 stored in a non-secure area. In response, the secure broker 526 may determine whether the mobile application 522 meets the security and operability requirements for the specific secure virtual environment 514 established on the mobile device. Should the mobile application 522 meet the security and operability requirements the mobile application 522 may be allowed to operate in the secure virtual environment 514 and be provided to the trusted mobile application environment 528. The trusted mobile application environment 528 may be an area of the secure virtual environment 514, including a GUI, in which the authorized applications operate. Should the mobile application 522 not meet the requirements of the secure broker 526, the mobile application 522 may not be allowed to interact further with the secure virtual environment 514.

Additionally the secure virtual environment may include a security and storage management system 530 that interacts with the trusted mobile application environment 528 and the key management system 534 to provide necessary security and storage capability.

An operating system 532 may be provided on the mobile device in both a non-secure area 502 and a secure area 504. The single operating system 532 may interact with the secure virtual environment 532 through the trusted mobile application environment 528 and mobile applications 522 in a non-secure area 502. The operating system 532 may be configured such that a mobile application 522 that does not meet the requirements of the secure broker 526 may only function in a non-secure area 502 of the operating system 532 and may only write or read data to the non-secure memory 536. The operating system 532 may also operate in the secure area 504 of the mobile device and read and write data to a secure memory 538.

Trusted mobile applications 524 may be provided to the trusted mobile application environment 528. Either trusted mobile applications 524, or mobile applications 522 that meet the requirements of the secure broker 526, may be provided to the operating system 544 through the trusted mobile application environment 528. Only applications in the trusted mobile application environment 528 interact with the secure memory 538 through the operating system 532. In the aspect illustrated in FIG. 7 the non-secure memory 536, the secure memory 538 and the key provisioning system 540 reside at the hardware level 518.

FIG. 8 illustrates another aspect system architecture 800 that includes modules similar to those described above with reference to FIG. 7, with the addition of a policy manager broker 542 in the secure virtual environment. The policy manager broker 542 may be in communication with the security and storage management system 530 and the trusted mobile application environment 528. Through either the trusted mobile application environment 528, or the security and storage management system 530, the policy manager broker 542 may receive corporate policy updates from the corporate entity.

The policy manager broker 542 may enable the corporate entity to update security protocols, update operating restrictions, and perform various functions in the secure virtual environment 514 and the secure area 504 of the mobile device. The policy manager broker 542 may provide the corporate entity with the ability to remotely update and control the secure virtual environment 514 and secure area 504 of the mobile device.

FIG. 9 illustrates another aspect of the system architecture 900 that includes modules similar to those described above with respect to FIG. 8, but with a single memory 536 on the mobile device. Additionally, in this aspect the operating system 532 resides entirely in the non-secure area 502. In this aspect data from the trusted mobile application environment 528 and all other data passes to a single non-secure memory 536. All data in the secure virtual environment 514 may be stored in an encrypted form when not in use by the trusted mobile application environment 528. The continual application of encryption at the data level by the secure virtual environment 514 ensures that secure data may be stored in a non-secure memory 536 because the secure data itself will be encrypted at the data level.

Figure 10:
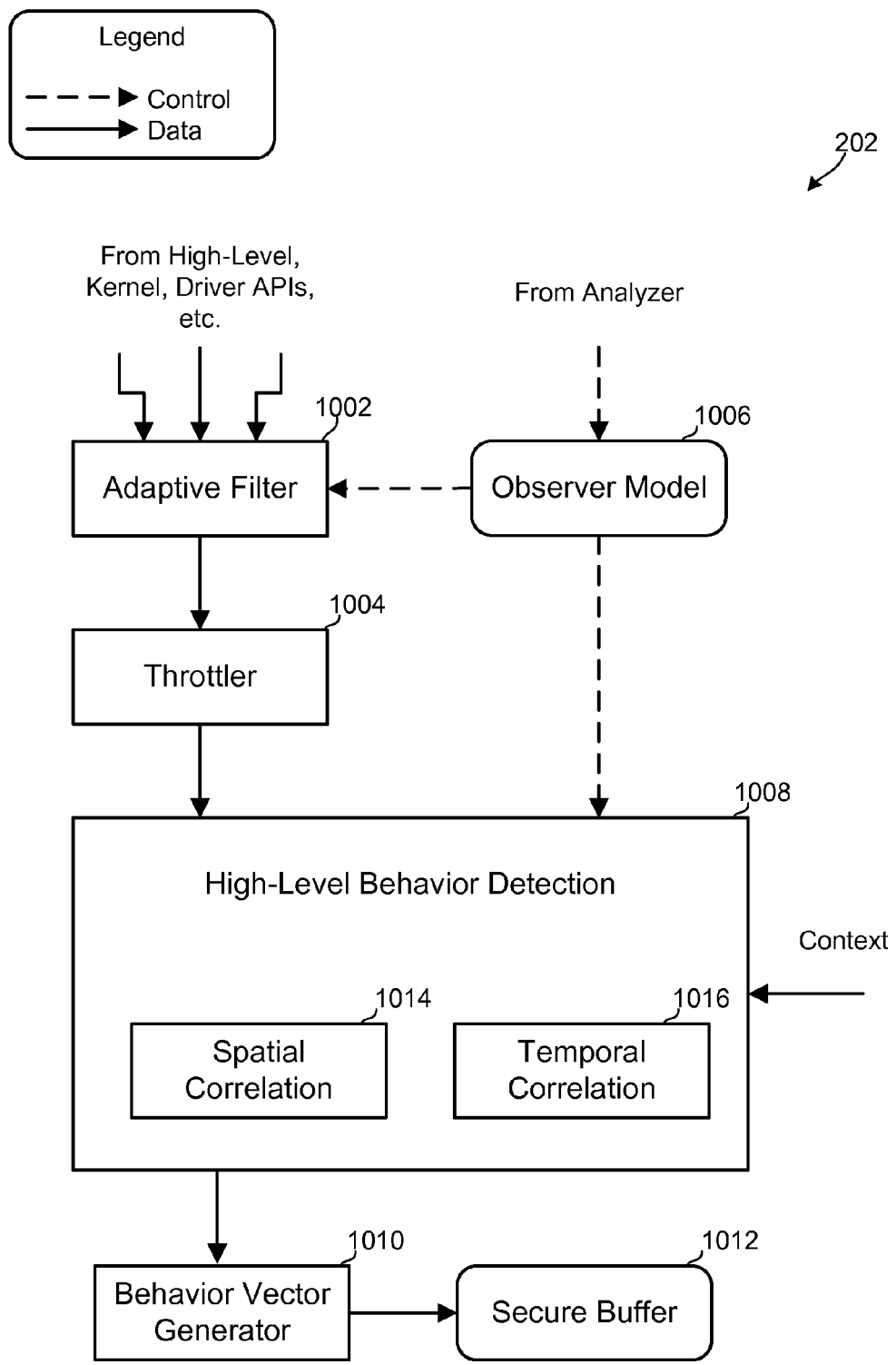
FIG. 10 is a block diagram illustrating example logical components and information flows in an observer module configured to perform dynamic and adaptive observations in accordance with an aspect.

FIG. 10 illustrates example logical components and information flows in an observer module 202 of a computing system configured to perform dynamic and adaptive observations in accordance with an aspect. The observer module 202 may include an adaptive filter module 1002, a throttle module 1004, an observer mode module 1006, a high-level behavior detection module 1008, a behavior vector generator 1030, and a secure buffer 1032. The high-level behavior detection module 1008 may include a spatial correlation module 1034 and a temporal correlation module 1036.

The observer mode module 1006 may receive control information from various sources, which may include an analyzer unit (e.g., the analyzer module 204 described above with reference to FIG. 2) and/or an application API. The observer mode module 1006 may provide control information pertaining to various observer modes to the adaptive filter module 1002 and the high-level behavior detection module 1008.

The adaptive filter module 1002 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 1004, which may be responsible for controlling the amount of information flowing from the filter to ensure that the high-level behavior detection module 1008 does not become flooded or overloaded with requests or information.

The high-level behavior detection module 1008 may receive data/information from the throttle module 1004, control information from the observer mode module 1006, and context information from other components of the mobile device. The high-level behavior detection module 1008 may use the received information to perform spatial and temporal correlations to detect or identify high level behaviors that may cause the device to perform at suboptimal levels. The results of the spatial and temporal correlations may be sent to the behavior vector generator 1030, which may receive the correlation information and generate a behavior vector that describes the behaviors of particular process, application, or sub-system. In an aspect, the behavior vector generator 1030 may generate the behavior vector such that each high-level behavior of a particular process, application, or sub-system is an element of the behavior vector. In an aspect, the generated behavior vector may be stored in a secure buffer 1032. Examples of high-level behavior detection may include detection of the existence of a particular event, the amount or frequency of another event, the relationship between multiple events, the order in which events occur, time differences between the occurrence of certain events, etc.

As discussed above, the observer module 202 may perform adaptive observation techniques and control the observation granularity based on information received from a variety of sources. For example, the high-level behavior detection module 1008 may receive information from the throttle module 1004, the observer mode module 1006, and context information received from other components (e.g., sensors) of the mobile device. As an example, a high-level behavior detection module 1008 performing temporal correlations might detect that a camera has been used and that the mobile device is attempting to upload the picture to a server. The high-level behavior detection module 1008 may also perform spatial correlations to determine whether an application on the mobile device took the picture while the device was holstered and attached to the user's belt. The high-level behavior detection module 1008 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 1008 may recognize this as a potentially threatening behavior and initiate an appropriate response (e.g., shutting off the camera, sounding an alarm, etc.).

In an aspect, the observer module 202 may be implemented in multiple parts.

Figure 11:
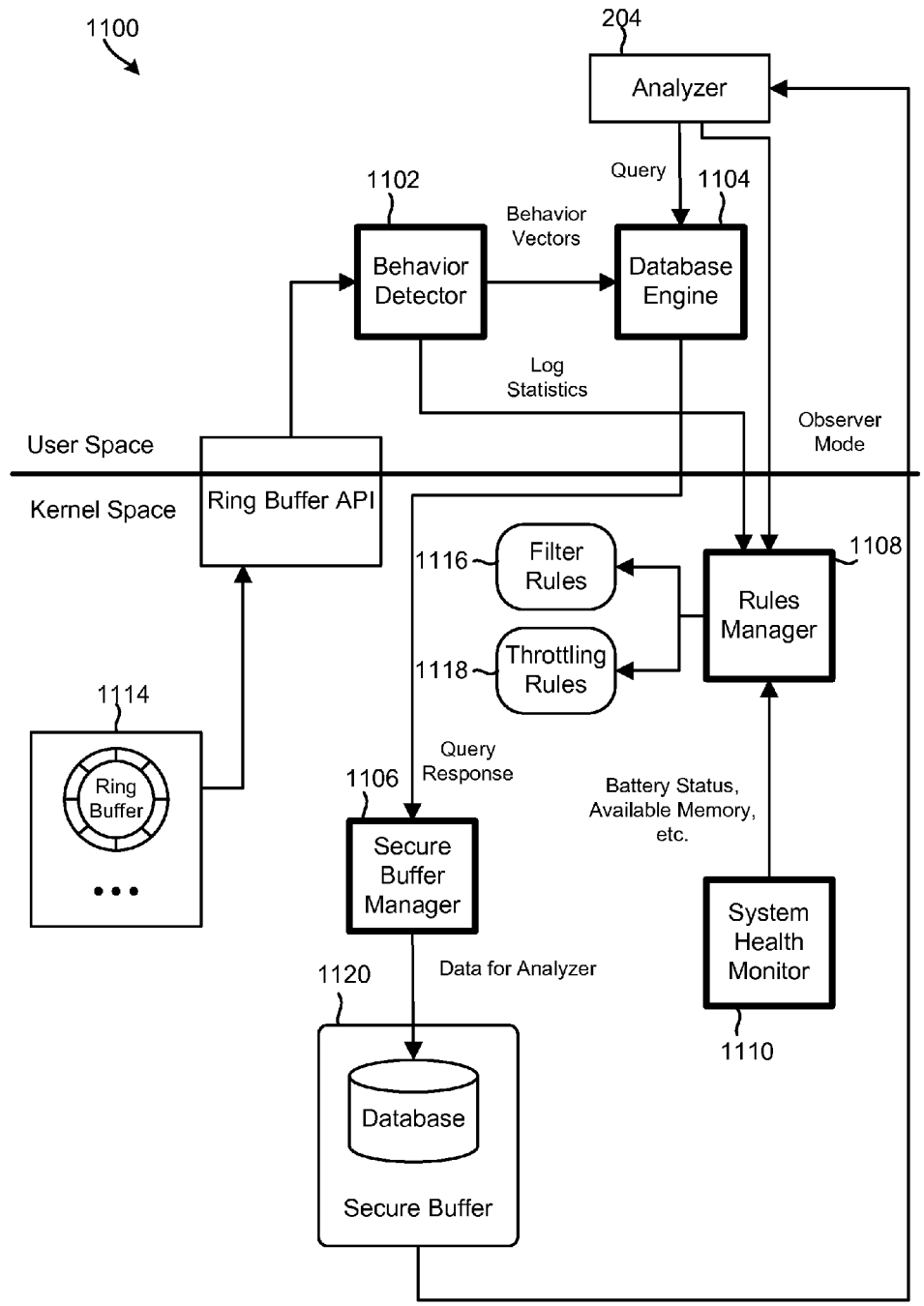
FIG. 11 is a block diagram illustrating example logical components and information flows in a computing system implementing observer daemons in accordance with another aspect.

FIG. 11 illustrates logical components and information flows in a computing system 1100 implementing an aspect observer daemon. In the example illustrated in FIG. 11, the computing system 1100 includes a behavior detector 1102 module, a database engine 1104 module, and an analyzer module 204 in the user space, and a ring buffer 1114, a filter rules 1116 module, a throttling rules 1118 module, and a secure buffer 1120 in the kernel space. The computing system 1100 may further include an observer daemon that includes the behavior detector 1102 and the database engine 1104 in the user space, and the secure buffer manager 1106, the rules manager 1108, and the system health monitor 1110 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 12A:
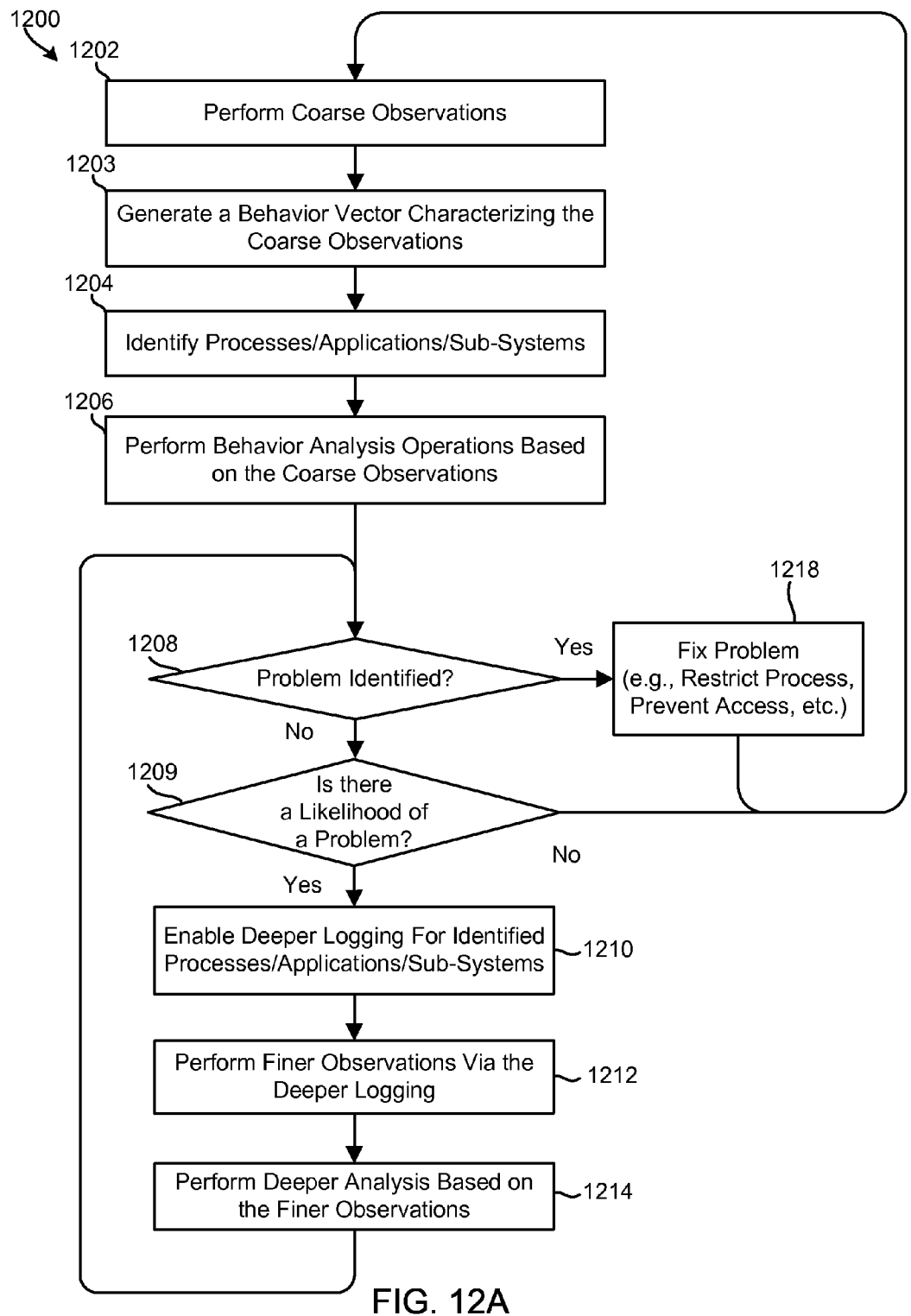
FIG. 12A is a process flow diagram illustrating an aspect method for performing adaptive observations on mobile devices.

FIG. 12A illustrates an example method 1200 for performing dynamic and adaptive observations in accordance with an aspect. In block 1202, the mobile device processor may perform coarse observations by monitoring/observing a subset of large number factors/behaviors that could contribute to the mobile device's degradation. In block 1203, the mobile device processor may generate a behavior vector characterizing the coarse observations and/or the mobile device behavior based on the coarse observations. In block 1204, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 1206, the mobile device processor may perform behavioral analysis operations based on the coarse observations. In an aspect, as part of blocks 1203 and 1204, the mobile device processor may perform one or more of the operations discussed above.

In determination block 1208, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 1208="Yes"), in block 1218, the processor may initiate a process to correct the behavior and return to block 1202 to perform additional coarse observations.

When the mobile device processor determines that the suspicious behaviors or potential problems cannot be identified and/or corrected based on the results of the behavioral analysis (i.e., determination block 1208="No"), in determination block 1209 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 1209="No"), the processor may return to block 1202 to perform additional coarse observations.

When the mobile device processor determines that there is a likelihood that suspicious behaviors or potential problems exist and/or are detectable (i.e., determination block 1209="Yes"), in block 1210, the mobile device processor may perform deeper logging/observations or final logging on the identified subsystems, processes or applications. In block 1212, the mobile device processor may perform deeper and more detailed observations on the identified subsystems, processes or applications. In block 1214, the mobile device processor may perform further and/or deeper behavioral analysis based on the deeper and more detailed observations. In determination block 1208, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 1208="No"), the processor may repeat the operations in blocks 1210-1214 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 1208="Yes"), in block 1218, the mobile device processor may perform operations to correct the problem/behavior, and the processor may return to block 1202 to perform additional operations. Alternatively or in addition, as part of operations in block 1218, the mobile device processor may configure or guide further observations of mobile device behavior based on whether the observed mobile device behaviors is determined to be suspicious. Alternatively or in addition, as part of operations in block 1218, the mobile device processor may alter the user of the device and/or a client module of malicious or performance-degrading behavior in a secure, tamper-proof manner.

In a further aspect, the mobile device processor may communicate with the observer module to request deeper observation of the suspicious behavior in response to determining that the mobile device behavior is suspicious. In another aspect, the mobile device processor may provide a secure tamper-proof message to the user of the device alerting to the possibility of malicious or performance-degrading behavior in response to determining that the mobile device behavior is malicious or performance-degrading behavior.

In an aspect, as part of blocks 1202-1218 of method 1200, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 12B:
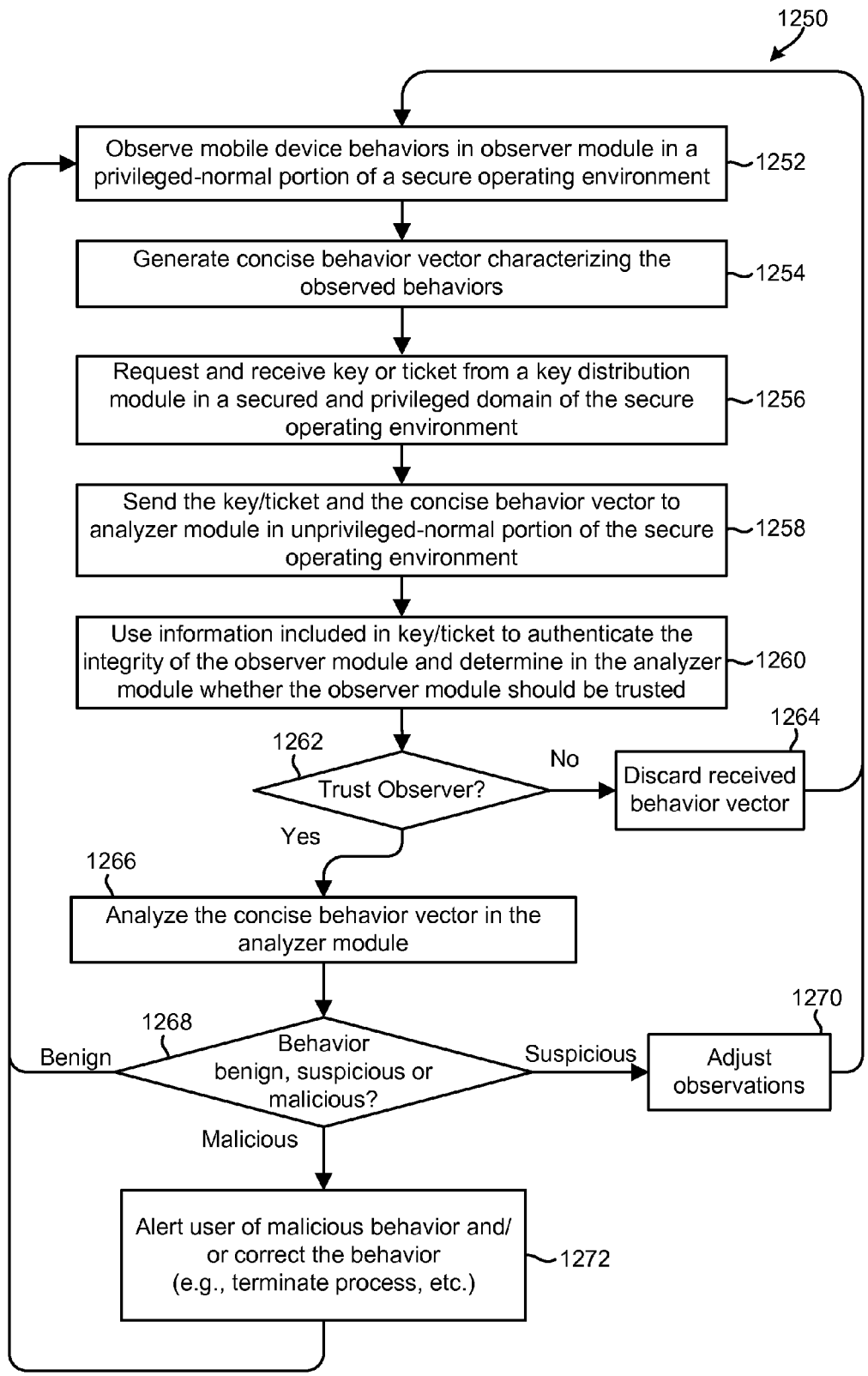
FIG. 12B is a process flow diagram illustrating another aspect method for performing adaptive observations on mobile devices over a trusted execution environment.

FIG. 12B illustrates a further aspect method 1250 for adapting the manner in which mobile device behaviors are observed and analyzed based on the results of the observations. In block 1252 of method 1250, the processor of the mobile device may observe mobile device behaviors in an observer module that is operating within a privileged-normal portion of a secure operating environment executing within the processor. Operating in such a privileged portion of the secure operating environment places the observer module beyond reach of malware or user manipulation, thereby providing greater security for the system. In block 1254, the observer module may generate a concise behavior vector that characterizes the observed behaviors. Such a concise behavior vector may be similar to the behavior vectors described above.

In block 1256, the observer module may request and receive a key or ticket from a key distribution module that is operating within a privileged-secure portion of the secure operating environment executing within the processor. In operation 1258, the observer module may provide the key/ticket and the concise behavior vector to an analyzer module that is executing within an unprivileged-normal or unprivileged-secure portion of the secure operating environment executing on the processor. This operation in block 1258 may involve storing the concise behavior vector in a secure buffer that is also accessible by the analyzer module. This operation in block 1258 may also, or alternatively, involve providing the vector across a secure protection boundary within the secure operating environment.

In block 1260, the analyzer module may use the information included in the key/ticket to authenticate the integrity of the observer module and/or the integrity of the communication channel or link between the observer and analyzer modules and determine whether the observer module may be trusted in determination block 1262. When the analyzer module determines that the information included in the key/ticket indicate that the observer module or the communication channel/link should not be trusted (i.e., determination block 1262="No"), the analyzer module my discard the received behavior vector in block 1264 and continue observing mobile device behaviors in block 1252. When the analyzer module determines that the information included in the key/ticket indicates that the observer module or the communication channel/link should be trusted (i.e., determination block 1262="Yes"), in block 1266, the analyzer module may analyze the received concise behavior vector in order to determine whether the observed behaviors are benign, suspicious, or malicious in determination block 1268.

If the analyzer module determines that the observed behaviors are benign, the processor may continue observing mobile device behaviors in the observer module in block 1252. If the analyzer module determines that the behaviors are suspicious, in block 1270 the analyzer module or another module executing in the processor (e.g., actuator module, etc.) may request adjustment in the type of behavior observations that are made by the observer module. For example, in response to recognizing a suspicious behavior, the analyzer module may communicate with the observer module to request deeper observation of the suspicious behavior.

If the analyzer module determines that the behaviors are malicious, in block 1272 the analyzer module or another module executing in the processor may alert the user of the mobile device and/or perform various operation to heal, cure, isolate, or otherwise fix the identified problem. This operation in block 1272 may involve providing a result of the analysis to the client module in an unprivileged-normal portion of the secure operating environment by writing the result in a secure buffer. When the user is notified, the operation in block 1272 may involve sending or displaying a secure tamper-proof message to the user of the device alerting to the possibility of malicious or performance-degrading behavior in response to determining that the mobile device behavior is malicious or performance-degrading behavior.

The operations in method 1250 may be executed continuously such that observations of the mobile device behaviors continue even as behavior vectors are analyzed by the analyzer module and further actions are taken in response.

Figure 13:
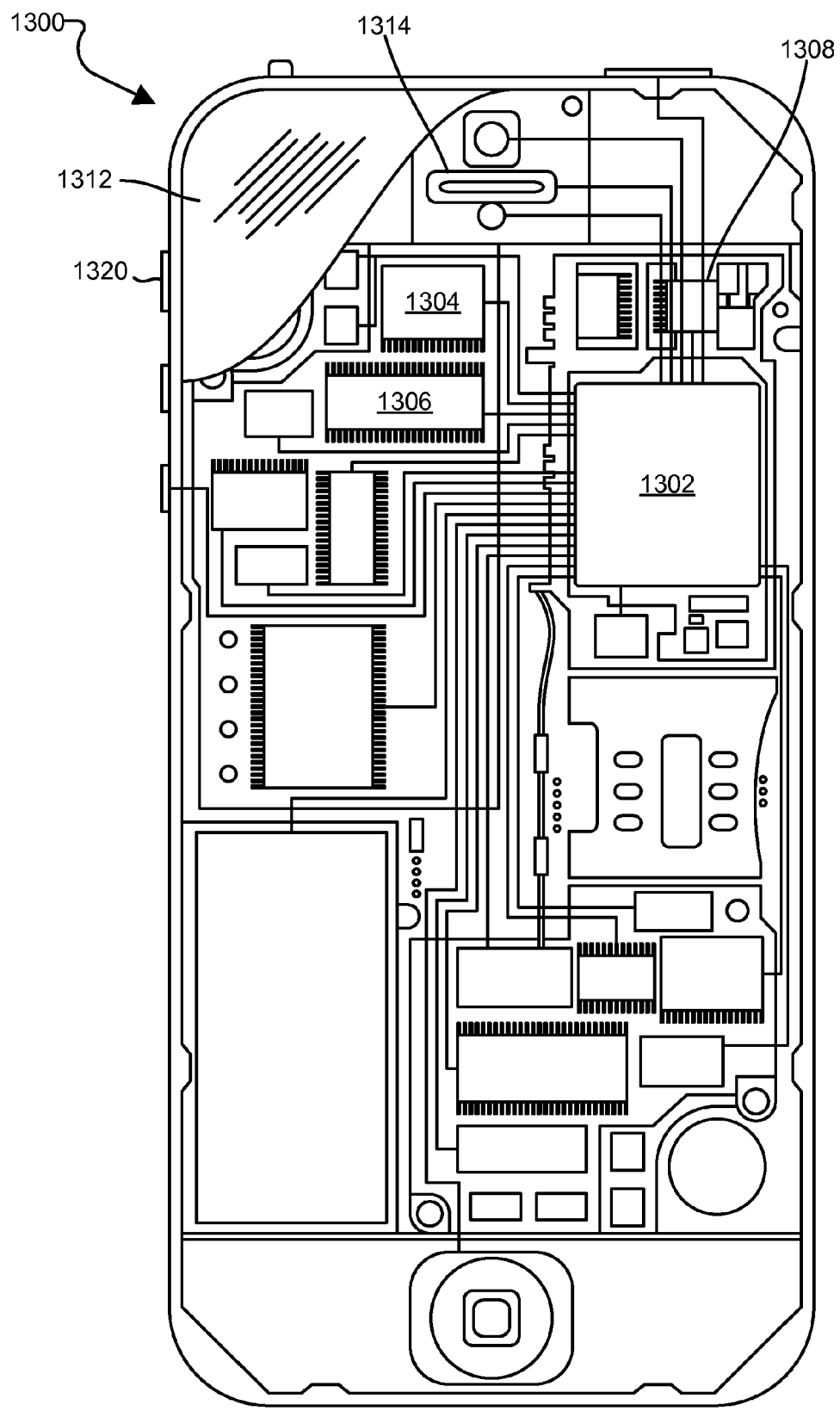
FIG. 13 is a component block diagram of a mobile device suitable for use in an aspect.

The various aspects may be implemented on a variety of computing devices, an example of which is illustrated in FIG. 13 in the form of a smartphone. A smartphone 1300 may include a processor 1302 coupled to internal memory 1304, a display 1312, and to a speaker 1314. Additionally, the smartphone 1300 may include an antenna for sending and receiving electromagnetic radiation that may be connected to a wireless data link and/or cellular telephone transceiver 1308 coupled to the processor 1302. Smartphones 1300 typically also include menu selection buttons or rocker switches 1320 for receiving user inputs.

A typical smartphone 1300 also includes a sound encoding/decoding (CODEC) circuit 1306, which digitizes sound received from a microphone into data packets suitable for wireless transmission and decodes received sound data packets to generate analog signals that are provided to the speaker to generate sound. Also, one or more of the processor 1302, wireless transceiver 1308 and CODEC 1306 may include a digital signal processor (DSP) circuit (not shown separately).

Figure 14:
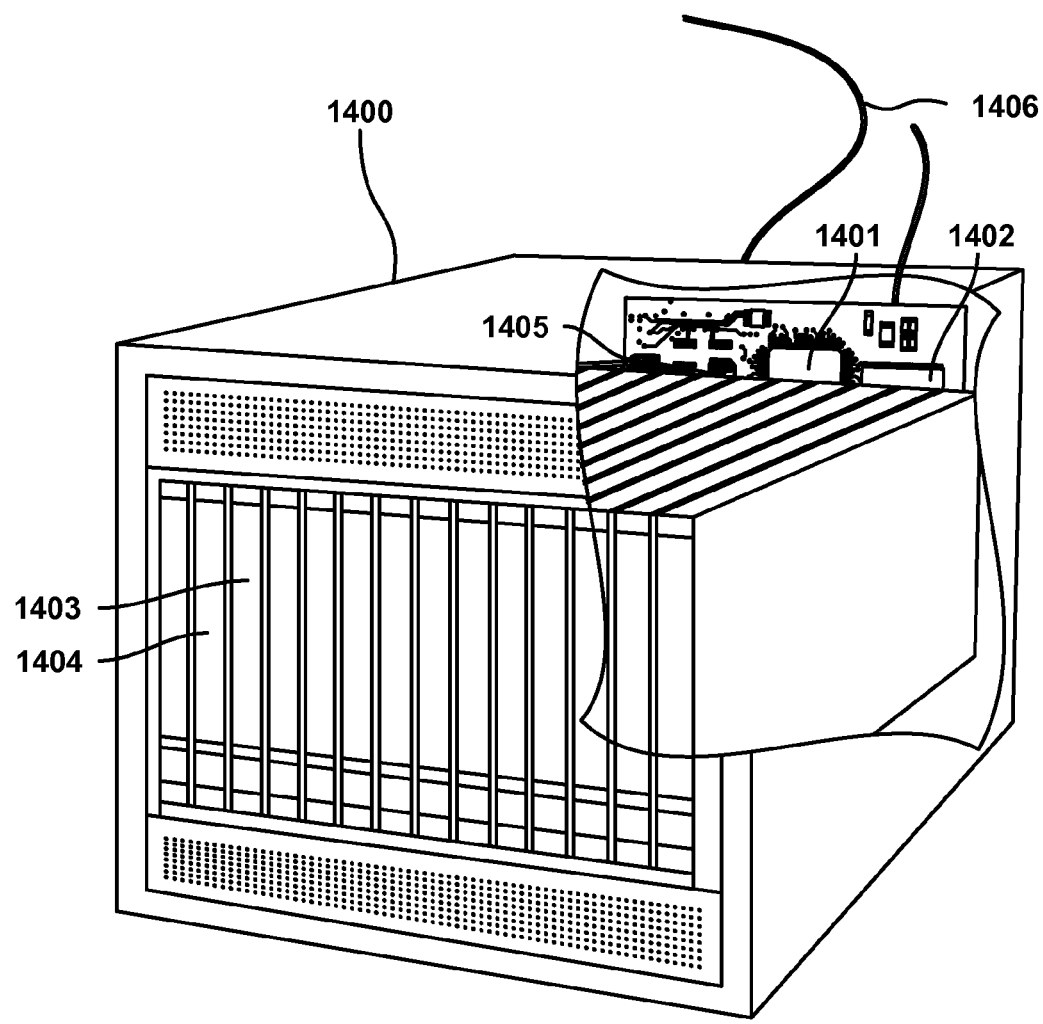
FIG. 14 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1405 coupled to the processor 1401 for establishing data connections with a network 1406, such as a local area network coupled to other broadcast system computers and servers.

The processors 1302, 1401 may be any programmable microprocessor, microcomputer or multiple processor chip or chips that can be configured by software instructions (applications) to perform a variety of functions, including the functions of the various aspects described below. In some mobile devices, multiple processors 1302 may be provided, such as one processor dedicated to wireless communication functions and one processor dedicated to running other applications. Typically, software applications may be stored in the internal memory 1304, 1402, 1403 before they are accessed and loaded into the processor 1302, 1401. The processor 1302, 1401 may include internal memory sufficient to store the application software instructions.

Many mobile computing devices operating system kernels are organized into a user space (where unprivileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

As used in this application, the terms "component," "module," "system," "engine," "manager," and the like are intended to include a computer-related entity, such as, but not limited to, hardware, firmware, a combination of hardware and software, software, or software in execution, which are configured to perform particular operations or functions. For example, a module or component may be, but are not limited to, a process running on a processor, a thread of execution, an object, an executable, a software application program, a processor, and/or a computer. By way of illustration, both an application running on a computing device and the computing device may be referred to as a component. In addition, one or more components or modules may reside within a process and/or thread of execution and may be localized on one processor or core and/or distributed between two or more processors or cores. In addition, these components/modules may execute from various non-transitory computer readable media having various instructions and/or data structures stored thereon. Modules may communicate by way of local and/or remote processes, function or procedure calls, electronic signals, data packets, memory read/writes, and other known computer, processor, and/or process related communication methodologies.

As used in this application, the term "system on chip" (SOC) refers a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

As used in this application, the term "multicore processor" refers to a single integrated circuit (IC) chip or chip package that contains two or more independent processing cores (e.g., CPU cores) configured to read and execute program instructions. An SOC may include multiple multicore processors, and each processor in an SOC may be referred to as a core. The term "multiprocessor" is used in this application to refer to a system or device that includes two or more processing units configured to read and execute program instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of monitoring and analyzing behaviors in a computing device having a high level operating system and a secure computing environment, comprising:
    executing a first process via one or more hardware processors of the computing device in a privileged-normal portion of the secure computing environment of the computing device, the first process monitoring device behaviors over a period of time to collect behavior information and using the behavior information to generate a behavior vector;
    executing a second process via the one or more hardware processors of the computing device in an unprivileged-normal portion of the secure computing environment of the computing device;
    executing a secure authentication process via the one or more hardware processors in a privileged-secure portion of the secure computing environment of the computing device;
    the first process providing a communication request message to the secure authentication process executing in the privileged-secure portion at the same or higher privilege level and at a higher security level than the first process;
    the secure authentication process using the information included in the communication request message to authenticate the first process in the privileged-secure portion of the computing device;
    the secure authentication process performing an integrity check of the first process in the privileged-secure portion of the computing device, the integrity check including the secure authentication process accessing a portion of a memory of the computing device allocated to the first process by the high level operating system to generate a cryptographic measurement in the privileged-secure portion;
    the secure authentication process generating a key that includes the generated cryptographic measurement in response to the secure authentication process successfully authenticating the first process and the secure authentication process successfully performing the integrity check of the first process;
    the secure authentication process in the privileged-secure portion providing the generated key to the first process in the privileged-normal portion;
    the first process in the privileged-normal portion providing a second communication request message that includes the generated behavior vector and the generated key to the second process executing in the unprivileged-normal portion of the secure computing environment of the computing device;
    the second process authenticating the first process based on the key and the cryptographic measurement included in the key to determine whether the first process can be trusted; and
    the second process analyzing the behavior vector included in the second communication request message received from the first process to determine whether a behavior is benign in response to the second process determining, based on the key and the cryptographic measurement included in the key, that the first process can be trusted.

2. The method of claim 1, wherein the secure authentication process generating the key comprises the secure authentication process generating the key to include information about a communication channel allocated to the first process by the high level operating system.

3. The method of claim 1, wherein the secure authentication process performing the integrity check of the first process comprises the secure authentication process generating a cryptographic hash of the first process's code, data, or both.

4. The method of claim 3, wherein the second process authenticating the first process based on the cryptographic measurement included in the key comprises:
    the second process comparing the cryptographic hash of the first process to a hash obtained from a public repository or from a repository internal to the second process.

5. A computing device, comprising:
    a multi-core processor including two or more processor cores, one or more of which is configured with processor-executable instructions to perform operations comprising:
        executing a first process in a privileged-normal portion of a secure computing environment of the computing device, the first process monitoring device behaviors over a period of time to collect behavior information and using the behavior information to generate a behavior vector;
        executing a second process in an unprivileged-normal portion of the secure computing environment of the computing device;
        executing a secure authentication process in a privileged-secure portion of the secure computing environment of the computing device;

the first process providing a communication request message to the secure authentication process executing in the privileged-secure portion of a secure computing environment of the computing device at the same or higher privilege level and at a higher security level than the first process;

the secure authentication process using the information included in the communication request message to authenticate the first process in the privileged-secure portion of the computing device;

the secure authentication process performing an integrity check of the first process in the privileged-secure portion of the computing device, the integrity check including the secure authentication process accessing a portion of a memory of the computing device allocated to the first process by a high level operating system of the computing device to generate a cryptographic measurement in the privileged-secure portion;

the secure authentication process generating a key that includes the generated cryptographic measurement in response to the secure authentication process successfully authenticating the first process and the secure authentication process successfully performing the integrity check of the first process;

the secure authentication process in the privileged-secure portion providing the generated key to the first process in the privileged-normal portion;

the first process in the privileged-normal portion providing a second communication request message that includes the generated behavior vector and the generated key to the second process executing in the unprivileged-normal portion of the secure computing environment;

the second process authenticating the first process based on the key and the cryptographic measurement included in the key to determine whether the first process can be trusted; and the second process analyzing the behavior vector included in the second communication request message received from the first process to determine whether a behavior is benign in response to the second process determining, based on the key and the cryptographic measurement included in the key, that the first process can be trusted.

6. The computing device of claim 5, wherein one or more of the processor cores is configured with processor-executable instructions to perform operations such that the secure authentication process generating the key comprises the secure authentication process generating the key to include information about a communication channel allocated to the first process by the high level operating system.

7. The computing device of claim 5, wherein one or more of the processor cores is configured with processor-executable instructions to perform operations such that the secure authentication process performing the integrity check of the first process comprises the secure authentication process generating a cryptographic hash of the first process's code, data, or both.

8. The computing device of claim 7, wherein one or more of the processor cores is configured with processor-executable instructions to perform operations such that the second process authenticating the first process based on the cryptographic measurement included in the key comprises:

the second process comparing the cryptographic hash of the first process to a hash obtained from a public repository or from a repository internal to the second process.

9. A non-transitory computer readable storage medium having stored thereon processor-executable software instructions configured to cause a processor to perform operations for monitoring and analyzing behaviors in a computing device having a high level operating system that includes a secure computing environment, the operations comprising:

executing a first process in a privileged-normal portion of the secure computing environment of the computing device, the first process monitoring device behaviors over a period of time to collect behavior information and using the behavior information to generate a behavior vector;

executing a second process via the one or more hardware processors of the computing device in an unprivileged-normal portion of the secure computing environment of the computing device;

executing a secure authentication process via the one or more hardware processors in a privileged-secure portion of the secure computing environment of the computing device;

the first process providing a communication request message to the secure authentication process executing in the privileged-secure portion of the secure computing environment of the computing device at the same or higher privilege level and at a higher security level than the first process;

the secure authentication process using the information included in the communication request message to authenticate the first process in the privileged-secure portion of the computing device;

the secure authentication process performing an integrity check of the first process in the privileged-secure portion of the computing device, the integrity check including the secure authentication process accessing a portion of a memory of the computing device allocated to the first process by the high level operating system of the computing device to generate a cryptographic measurement in the privileged-secure portion;

the secure authentication process generating a key that includes the generated cryptographic measurement in response to the secure authentication process successfully authenticating the first process and the secure authentication process successfully performing the integrity check of the first process;

the secure authentication process in the privileged-secure portion providing the generated key to the first process in the privileged-normal portion;

the first process in the privileged-normal portion providing a second communication request message that includes the generated behavior vector and the generated key to the second process executing in the unprivileged-normal portion of the secure computing environment of the computing device;

the second process authenticating the first process based on the key and the cryptographic measurement included in the key to determine whether the first process can be trusted; and the second process analyzing the behavior vector included in the second communication request message received from the first process to determine whether a behavior is benign in response to the second process determining, based on the key and the cryptographic measurement included in the key, that the first process can be trusted.

10. The non-transitory computer readable storage medium of claim 9, wherein the stored processor-executable software instructions are configured to cause a processor to perform operations such that the secure authentication process generating the key comprises the secure authentication process generating the key to include information about a communication channel allocated to the first process by the high level operating system.

11. The non-transitory computer readable storage medium of claim 9, wherein the stored processor-executable software instructions are configured to cause a processor to perform operations such that:
- the secure authentication process performing the integrity check of the first process comprises the secure authentication process generating a cryptographic hash of the first process's code, data, or both; and
- the second process authenticating the first process based on the cryptographic measurement included in the key comprises the second process comparing the cryptographic hash of the first process to a hash obtained from a public repository or from a repository internal to the second process.

* * * * *